United States Patent
Kisanuki

(10) Patent No.: US 10,240,920 B2
(45) Date of Patent: Mar. 26, 2019

(54) DEFORMATION ANALYSIS APPARATUS

(71) Applicant: KABUSHIKI KAISHA TOYOTA CHUO KENKYUSHO, Nagakute-shi, Aichi-ken (JP)

(72) Inventor: Yoshikatsu Kisanuki, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 435 days.

(21) Appl. No.: 14/642,055

(22) Filed: Mar. 9, 2015

(65) Prior Publication Data
US 2015/0276395 A1 Oct. 1, 2015

(30) Foreign Application Priority Data
Mar. 25, 2014 (JP) .................. 2014-062599

(51) Int. Cl.
*G01B 21/32* (2006.01)
*G01B 21/04* (2006.01)

(52) U.S. Cl.
CPC ............ *G01B 21/04* (2013.01); *G01B 21/32* (2013.01)

(58) Field of Classification Search
CPC ....... G01B 21/04; G01B 11/00–11/306; G01B 21/20; G01B 21/16; G01B 11/03; G01B 21/00–21/32; G01P 15/00; G01P 15/18; G01M 17/007
See application file for complete search history.

(56) References Cited

U.S. PATENT DOCUMENTS

2014/0350869 A1* 11/2014 Ide .................. G01M 17/0078
    702/35
2017/0074689 A1*  3/2017 Lubberhuizen ........ G01B 21/04

FOREIGN PATENT DOCUMENTS

| CN | 102305612 A | * | 1/2012 | ............. G01B 21/32 |
| JP | H10-33506 A | | 2/1998 | |
| JP | 2005-182529 A | | 7/2005 | |

(Continued)

OTHER PUBLICATIONS

Hoshi, Takayuki et al., "Three-Dimensional Shape Capture Sheet Using Distributed Six-Axis Sensors," INSS, 2008, pp. 156-161.

(Continued)

*Primary Examiner* — Eric A. Ward
*Assistant Examiner* — Eric K Ashbahian
(74) *Attorney, Agent, or Firm* — Oliff PLC

(57) ABSTRACT

Position data interpolation unit interpolates 3D coordinate values or rotation angles, for periods of time, at each interpolation position on line segments that connect adjacently installed sensors, based on 3D coordinate values or rotation angles of the respective installation positions of the plurality of sensors measured by the measurement unit. A coordinate conversion unit computes 3D coordinate values of each position corresponding to a 3D shape of the measurement target object at periods of time, based on 3D coordinate values or rotation angles of the respective installation positions of the plurality of sensors measured at periods of time, based on 3D coordinate values or rotation angles of each of the interpolation positions on line segments that connect sensors interpolated at periods of time, and based on relative distances between the adjacently installed sensors along deformed shape of the measurement target object.

4 Claims, 51 Drawing Sheets

(56) References Cited

FOREIGN PATENT DOCUMENTS

| | | |
|---|---|---|
| JP | 2006-038710 A | 2/2006 |
| JP | 2010-066169 A | 3/2010 |
| JP | 2013-181966 A | 9/2013 |

OTHER PUBLICATIONS

Rendl, Christian et al., "FlexSense: A Transparent Self-Sensing Deformable Surface," UIST, 2014.

\* cited by examiner

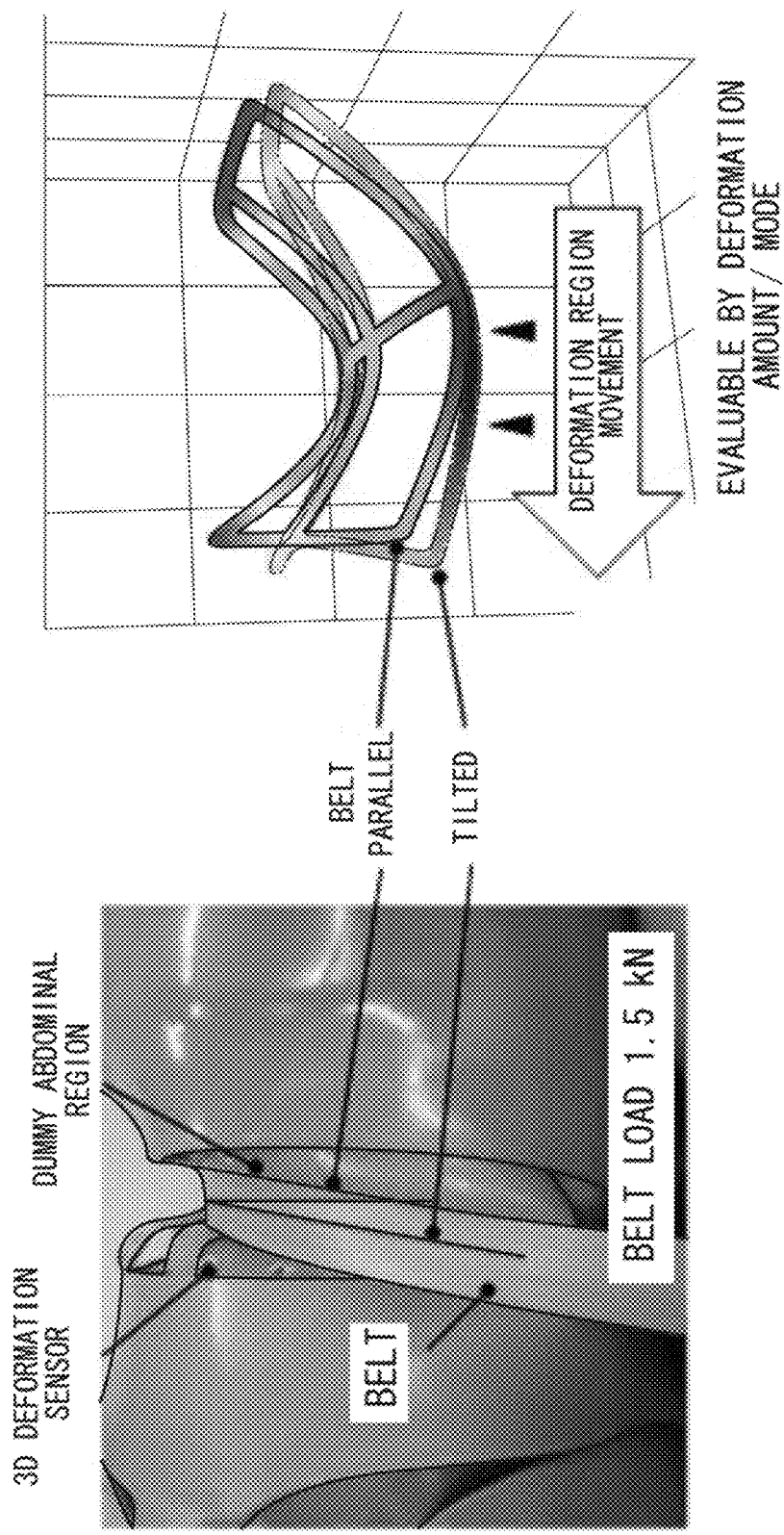

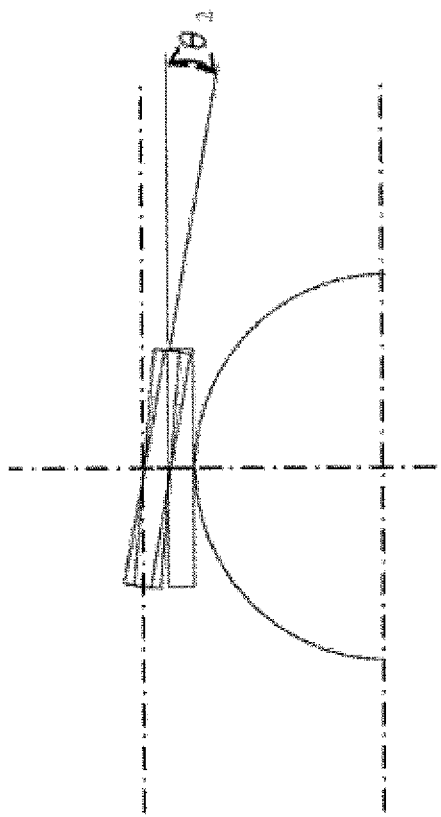

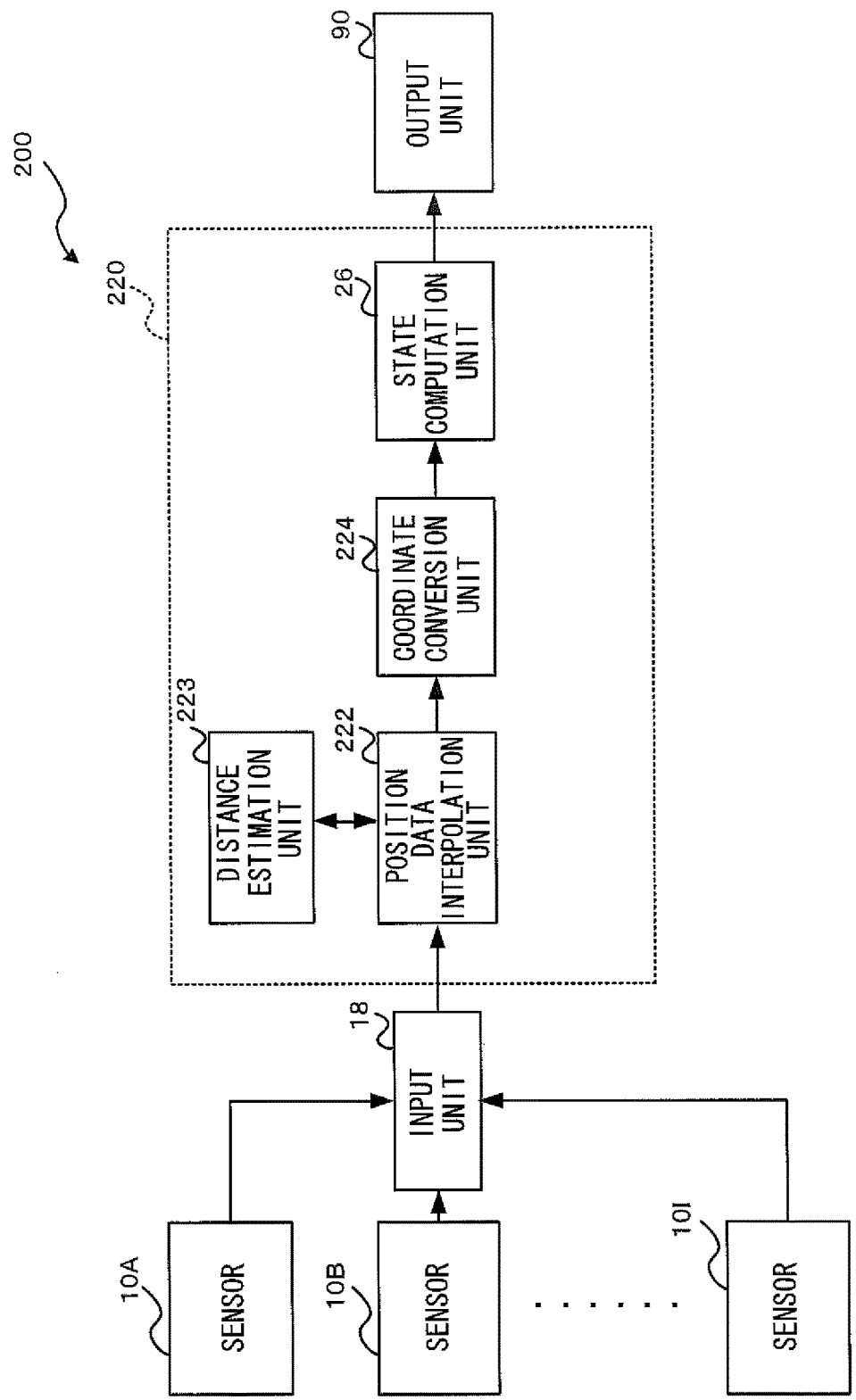

WHEN EXTENDED

FIG.14

| MEASUREMENT TARGET OBJECT | EXTENSION OF MEASUREMENT FACE | ATTACHMENT STATE | CORRECTION PROCESSING |
|---|---|---|---|
| FLAT SHEET BODY | ABSENT OR IGNORABLE | DIRECT | — |
| | PRESENT | INDIRECT | 1: ADJACENT SLOPE ANGLE CORRECTION, 2: POSITION DETECTION CORRECTION |
| SOLID BODY | ABSENT OR IGNORABLE | DIRECT | — |
| | PRESENT | INDIRECT | 1: ADJACENT SLOPE ANGLE CORRECTION, 2: POSITION DETECTION CORRECTION |

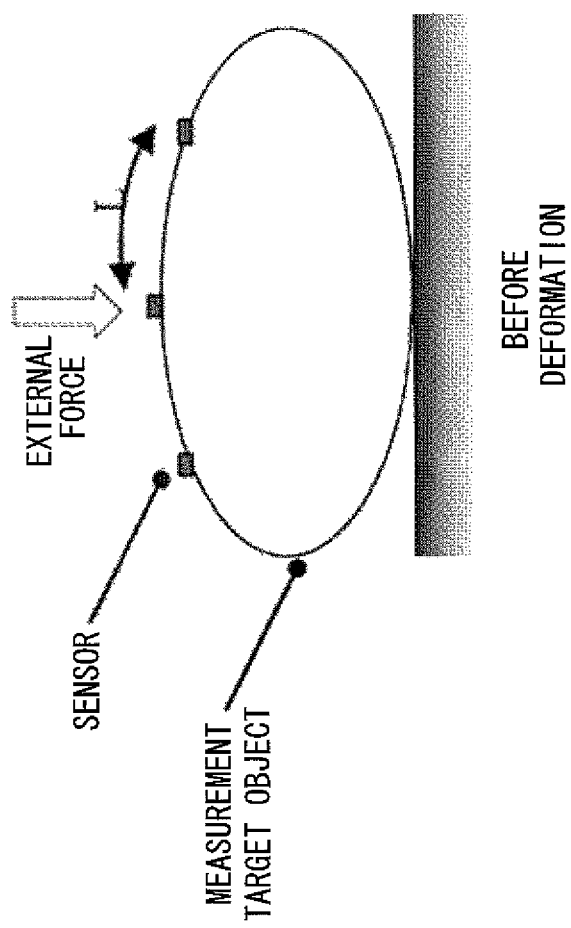

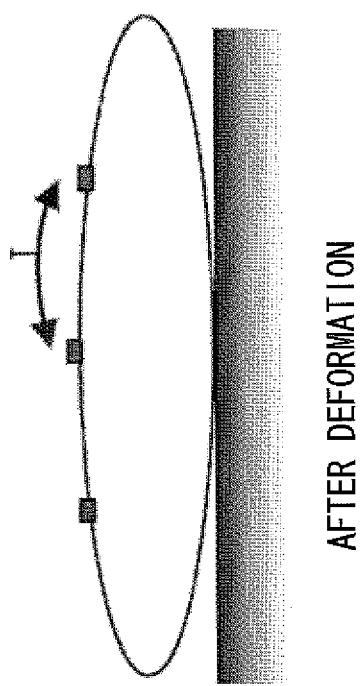

EXAMPLE OF FINITE ELEMENT ANALYSIS MODEL OF HUMAN BODY

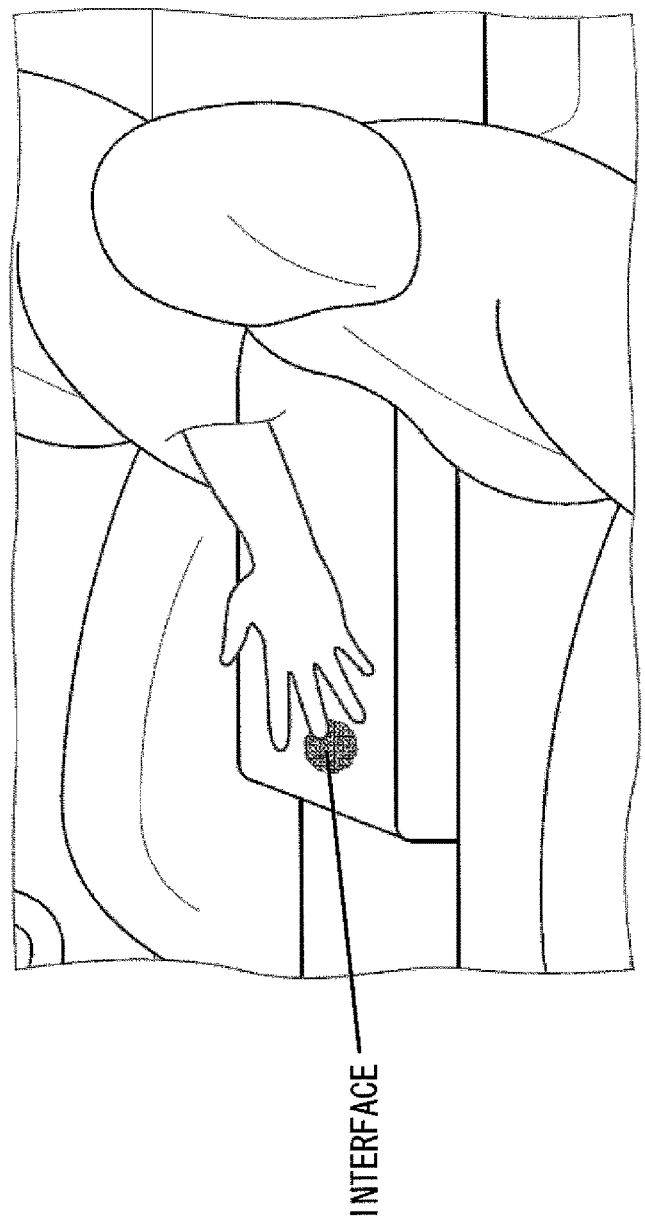

AIR CONDITIONING CONTROL

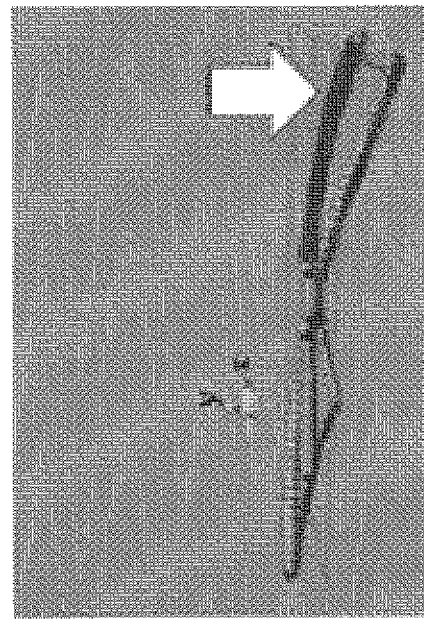

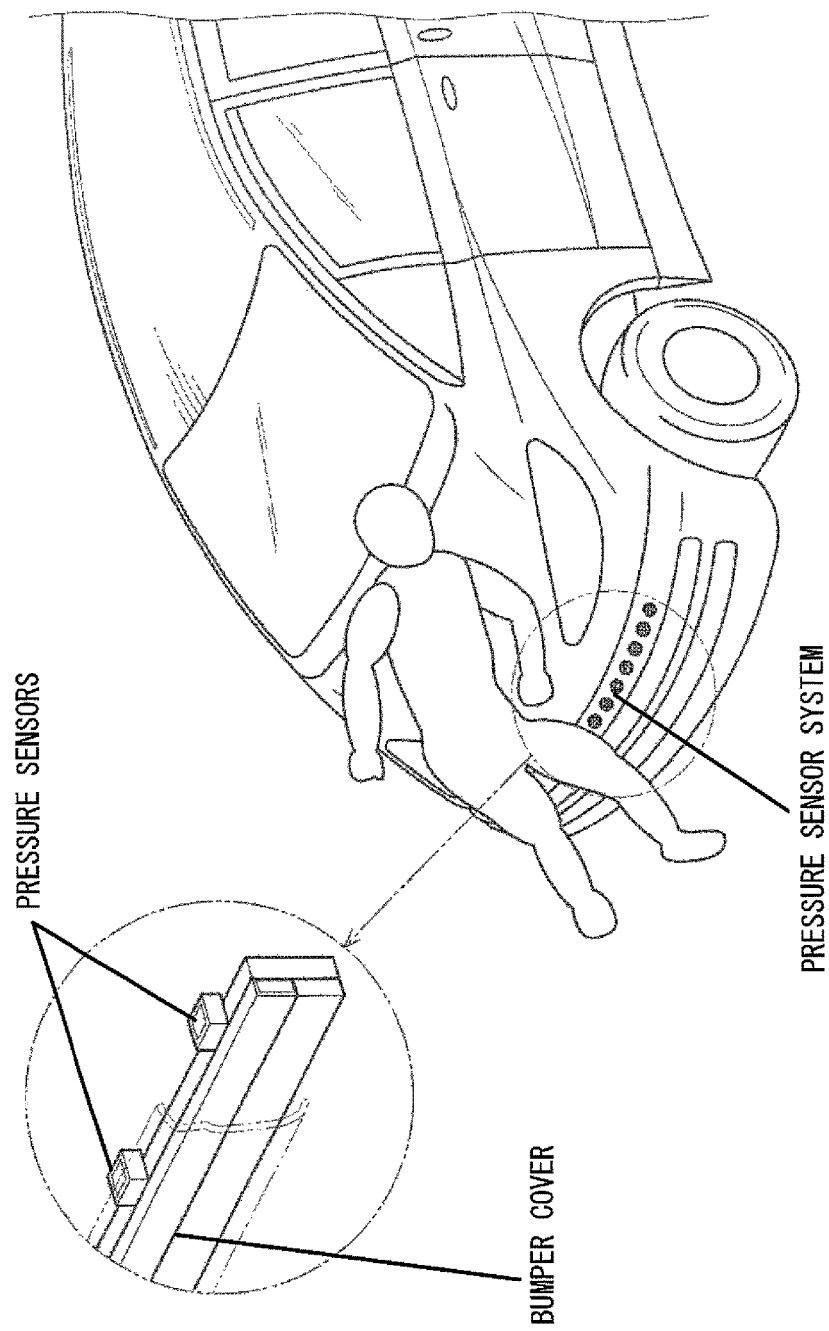

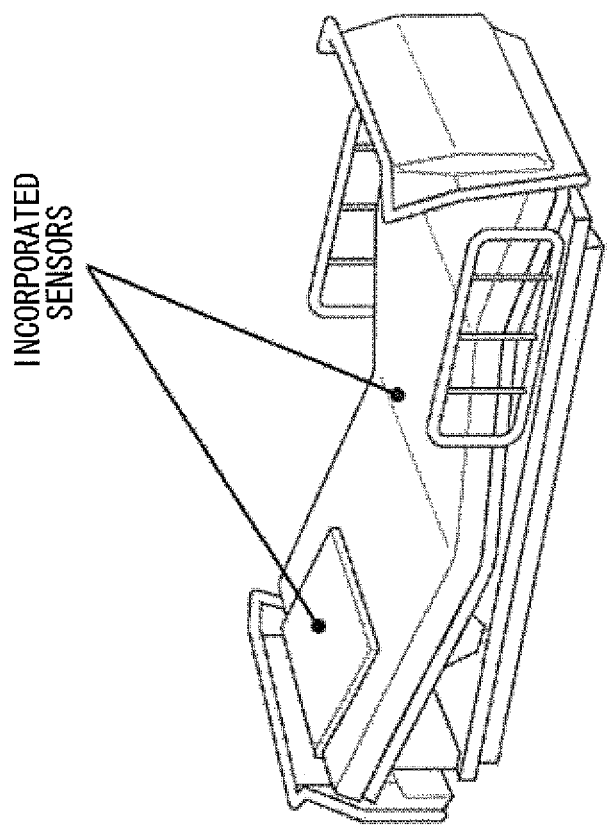

DEFORMATION ANALYSIS APPARATUS

CROSS-REFERENCE TO RELATED APPLICATIONS

This application claims priority under 35 USC 119 from Japanese Patent Application No. 2014-062599, the disclosure of which is incorporated by reference herein.

All publications, patent applications, and technical standards mentioned in this specification are herein incorporated by reference to the same extent as if each individual publication, patent application, or technical standard was specifically and individually indicated to be incorporated by reference.

BACKGROUND OF THE INVENTION

Field of the Invention

The present invention relates to a deformation analysis apparatus, and in particular to a deformation analysis apparatus that performs deformation analysis on a measurement target object.

Description of the Related Art

Hitherto, as deformation analysis apparatus that ascertain deformation states of a structural object, an apparatus is known that measures by employing a tape sensor using a strain gauge when performing two dimensional measurement on a measurement target object (see Japanese Patent Application Laid-Open (JP-A) No. H10-33506). A measurement system employing a piezoelectric film sheet is also known (see JP-A No. 2006-38710).

For 3D measurements of a measurement target object, a laser 3D deformation analysis apparatus, a micro CCD scope, ultrasound measurement apparatus, an X-ray measurement apparatus, and the like are also known (see JP-A No. 2010-66169). Apparatuses that employ strain gauges and CCD cameras are also known (see JP-A No. 2005-182529).

For two dimensional measurements of a measurement target object, tape sensors and piezoelectric film sheets are capable of measuring deformation of a measurement target object only in two dimensions due to the measurement range being two dimensional deformation. However, in reality many measurement target objects deform more than a little in three dimensions, with the issue that errors arise in measurements using tape sensors and piezoelectric film sheets. This is due to errors in curvature measurement when computing deformation using tape sensors and piezoelectric film sheets. Namely, this is because in measurements using elongated sensors such as tape sensors and piezoelectric film sheets, components due to twisting deformation are superimposed on measurement values of strain gauges and electromotive force of piezoelectric films when twisting deformation is imparted to the sensor at the same time as bending deformation. This gives rise to the issue that measurement target objects measurable using such sensors are limited. Such sensors employ circular plates of known curvature so that twisting deformation does not occur in order to associate strain and electromotive force with curvature.

In the method of JP-A No. 10-33506, in order to measure a measurement target object surface using tape sensors to measure changes in shape of a surface with high precision, a body supporter is employed for the purpose of placing the tape sensors in close contact with the surface. However, there is an issue that the obtained results are unable to sufficiently measure change in shape of the surface, since no consideration is given to changes due to extension of the surface. Explanation follows regarding FIG. 39A and FIG. 39B. A natural length state of a flexible body M is the deformed state as illustrated in FIG. 39A. However, when external force acts, the deformed state is as illustrated in FIG. 39B. In the state of FIG. 39A, the length of a sensor N is length LB from a fixed end G to a measurement point B. However, in FIG. 39B, due to the length of the sensor N being fixed, the shape measurement range of the flexible body M is a length as far as the vicinity of a measurement point A. In response to deformation of the flexible body M, the range the sensor N measures thus changes according to the deformation state. However, in the state of FIG. 39B, if LN, the length of the sensor N, is longer than the length LM of the flexible body M, all the deformation of the flexible body M in the states of FIG. 39A and FIG. 39B can be measured, however the extension length due to deformation of the flexible body M still has an influence on the measurement result of the sensor N.

Moreover, as apparatuses for the purpose of 3D measurement, measurements are performed using lasers, ultrasound, X-rays, and the like, and CCD cameras. However such apparatuses take a sighting of the measurement face of the measurement target object. Namely, visual data needs to be obtained. Thus there is the issue that measurement is difficult due to not being able to obtain visual data, for example, in cases where the measurement face is in contact with another object face, or cases in which the measurement target object is within another object. A specific example of a case in which the measurement face is in contact with another object face is deformation of a seatback or seat cushion face, and deformation of the face of the back and the face of the buttocks in a seated state of a person or dummy in a seat. A specific example of a case in which the measurement target object is inside another body is deformation of the spinal column and deformation of rib bones or the like of a dummy employed in a crash test. Moreover, there is the issue that the conditions of measurement are limited due to it being difficult to measure with such apparatuses in cases in which the external profile and volume of the sensors is large, and the measurement target object is tiny, and in cases in which the space to perform measurement is confined.

SUMMARY OF THE INVENTION

The present invention has been made in view of the above circumstances and provides a deformation analysis apparatus.

A deformation analysis apparatus according to a first aspect is configured including: a plurality of sensors that are installed at a measurement target object, each sensor detecting a physical quantity acting on an installation position; a measurement unit that, when deformation has occurred in the measurement target object, measures for each of plural specific periods of time at least one of 3D coordinate values or rotation angles of the respective installation positions of the plurality of sensors based on the physical quantity detected by each of the plurality of sensors; an interpolation unit that interpolates at least one of 3D coordinate values or rotation angles, for each of the specific periods of time, at each interpolation position on line segments that connect adjacently installed sensors, based on the at least one of 3D coordinate values or rotation angles of the respective installation positions of the plurality of sensors measured at each of the specific periods of time by the measurement unit; and a coordinate computation unit that computes 3D coordinate values of each position corresponding to a 3D shape of the measurement target object at each of the specific periods of time, based on the at least one of 3D coordinate values or rotation angles of the respective installation positions of the plurality of sensors measured at each of the specific periods of time by the measurement unit, based on the at least one of 3D coordinate values or rotation angles of each of the interpolation positions on line segments that connect sensors interpolated at each of the specific periods of time by the interpolation unit, and based on relative distances between the adjacently installed sensors along a deformed shape of the measurement target object.

According to the first aspect, the plurality of sensors detect physical quantities acting on installation positions, and when deformation has occurred in the measurement target object, the measurement unit measures for each of plural specific periods of time at least one of 3D coordinate values or rotation angles of the respective installation positions of the plurality of sensors based on the physical quantities detected by the sensors. The interpolation unit interpolates at least one of 3D coordinate values or rotation angles, for each of specific periods of time, at each interpolation position on line segments that connect adjacently installed sensors, based on the at least one of 3D coordinate values or rotation angles of the respective installation positions of the plurality of sensors measured at each of the specific periods of time. The coordinate computation unit computes 3D coordinate values of each position corresponding to a 3D shape of the measurement target object at each of the specific periods of time, based on the at least one of 3D coordinate values or rotation angles of the respective installation positions of the plurality of sensors measured at each of the specific periods of time, based on the at least one of 3D coordinate values or rotation angles of each of the interpolation positions on line segments that connect sensors interpolated at each of the specific periods of time, and based on relative distances between the adjacently installed sensors along a deformed shape of the measurement target object.

This thereby enables high precision deformation analysis of the measurement target object to be performed by interpolating, at each of the specific periods of time, the at least one of 3D coordinate values or rotation angles of each of the interpolation positions on line segments that connect sensors based on the at least one of 3D coordinate values or rotation angles of each of the installation positions of the plurality of sensors measured at each of the specific periods of time, and computing 3D coordinate values of each position corresponding to a 3D shape of the measurement target object at each of the specific periods of time.

BRIEF DESCRIPTION OF THE DRAWINGS

Exemplary embodiments of the present invention will be described in detail based on the following figures, wherein:

FIG. 9 is a diagram illustrating an example the effect of a lap belt path on a dummy abdominal region surface shape;

FIG. 10C is a diagram illustrating an example of a relationship between external dimensions of a sensor and a measurement face of a measurement target object;

FIG. 11 is a block diagram illustrating a configuration of a deformation analysis apparatus according to a second exemplary embodiment of the present invention;

FIG. 14 is a diagram illustrating an example of correction according to the state of a measurement face;

FIG. 15A is a diagram illustrating an example of a tiny shape change as a change in relative distances between sensors;

FIG. 15B is a diagram illustrating an example of a tiny shape change as a change in relative distances between sensors;

FIG. 33A is a diagram illustrating an example of a human interface installed in an armrest;

FIG. 33E is a diagram illustrating an example of a human interface installed in an armrest;

FIG. 34 is a diagram illustrating an example of utilization as bumper sensors;

FIG. 37B is a diagram illustrating an example of utilization in nursing equipment;

DETAILED DESCRIPTION OF THE INVENTION

Detailed explanation follows regarding exemplary embodiments of the present invention, with reference to the drawings.

Figure 1:
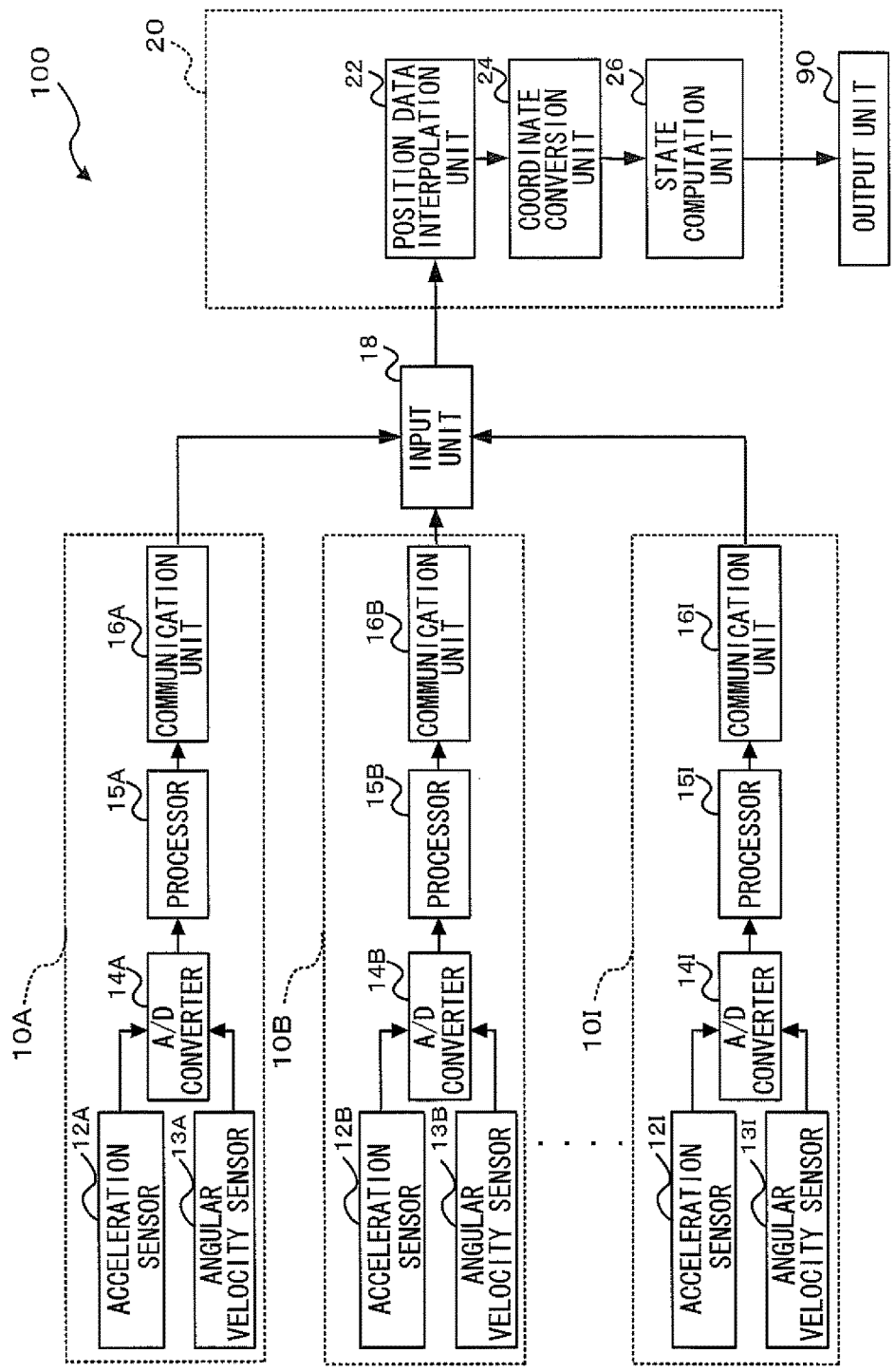
FIG. 1 is a block diagram illustrating a configuration of a deformation analysis apparatus according to a first exemplary embodiment of the present invention.

Configuration of a Deformation Analysis Apparatus According to a First Exemplary Embodiment Explanation first follows regarding a configuration of a deformation analysis apparatus according to a first exemplary embodiment of the present invention. As illustrated in FIG. 1, a deformation analysis apparatus 100 according to an exemplary embodiment of the present invention may be configured by a computer including a CPU, a RAM, and ROM stored with a program that executes a deformation analysis processing routine, described below, and various data. As illustrated in FIG. 1, the deformation analysis apparatus 100 functionally includes sensors 10A to 10I, an input unit 18, a computation unit 20, and an output unit 90.

Figure 2:
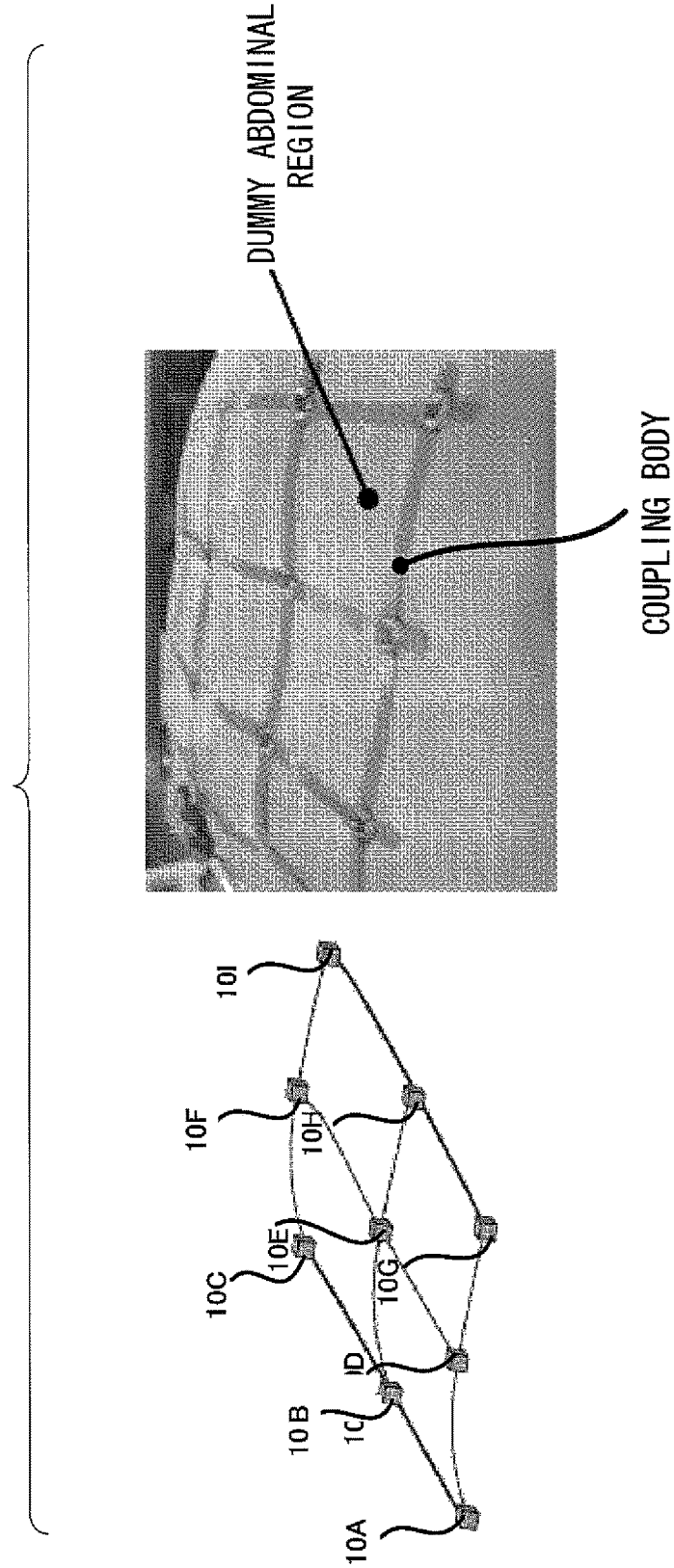
FIG. 2 is a diagram illustrating an example of sensor installation of a deformation analysis apparatus according to the first exemplary embodiment of the present invention.

As illustrated in FIG. 2, the respective sensors 10A to 10I are installed in a lattice shape on an abdominal region surface of a crash test dummy that is a measurement target object. Each of the sensors 10A to 10I is connected to the input unit 18 through a deformable signal line and a power line. Each of the sensors 10A to 10I is joined to a coupling body that fixes a relative distance L between adjacently installed sensors. The relative distance L between the adjacently installed sensors along a deformed shape of the measurement target object is fixed irrespective of deformation of the measurement target object.

Each of the sensors 10B to 10I is configured similarly to the sensor 10A, and so explanation follows regarding the configuration of the sensor 10A. The sensor 10A is configured including an acceleration sensor 12A that detects tri-axial acceleration in the sensor coordinate axes, an angular velocity sensor 13A that detects angular velocity about the three axes of the sensor coordinate axes, an A/D converter 14A, a processor 15A, and a communication unit 16A.

The acceleration sensor 12A detects tri-axial acceleration in the sensor coordinate axes as an analogue value of a physical quantity for each of specific periods of time, and outputs the detected analogue values to the A/D converter 14A.

The angular velocity sensor 13A detects angular velocity about the three axes of the sensor coordinate axes as analogue values of a physical quantity for each of specific periods of time, and outputs the detected angular velocities to the A/D converter 14A.

The A/D converter 14A converts the analogue values of the acceleration input from the acceleration sensor 12A, and the analogue values of the angular velocity input from the angular velocity sensor 13A, into digital values of acceleration, and digital values of angular velocity, and outputs the digital values to the processor 15A.

The processor 15 integrates the digital values of the acceleration and the digital values of angular velocity input from the A/D converter 14 with respect to time, and, for each specific period of time, measures a change amount in 3D coordinate values, and a change amount in the rotation angle, in the sensor coordinate axes of the sensor 10A. The processor 15 measures 3D coordinate values and rotation angles of the sensor 10A in world coordinate system axes based on the measured change amount of the 3D coordinate values and the change amounts of the rotation angles, based on the previous measurement value or the initial value of the 3D coordinate values of the sensor 10A in the world coordinate system axes, and based on the previous measurement value or the initial value of the rotation angle. The processor 15 then outputs the measured 3D coordinate values and the rotation angle of the sensor 10A in the world coordinate system axes to the input unit 18, via the communication unit 16A. The processor 15 may perform filtering processing in consideration of the effects of noise and drift when performing processing to integrate the acceleration and angular velocity. It is possible for such filtering processing to have characteristics that change according to the signal waveform conditions. The 3D coordinate values and rotation angles in the world coordinate system axes are referred to below as 3D position data. The 3D position data for an initial state of each of the sensors 10A to 10I is pre-stored in memory (not illustrated in the drawings). The processor 15 takes a double integration with respect to time for the acceleration, and takes a single integration with respect to time for the angular velocity.

The acceleration sensor is a sensor that determines displacement from its measured acceleration as described above. The angular velocity sensor is a sensor that determines rotation angle from its measured angular velocity. It is accordingly possible to replace the acceleration sensor with a displacement sensor. It is moreover also possible to replace the angular velocity sensor with a rotation angle sensor. Thus the sensors employed in the present exemplary embodiment are not limited to being an acceleration sensor and an angular velocity sensor. It is moreover possible to mix sensors. For example, depending on the measurement conditions, it is possible to configure the sensors employed in the present exemplary embodiment by disposing a mixture of acceleration sensors, angular velocity sensors, strain gauges, and piezoelectric films.

The input unit 18 is input from each of the sensors 10A to 10I for each specific period of time, receives 3D position data for each of the sensors 10A to 10I, and stores the 3D position data in memory (not illustrated in the drawings).

Figure 3:
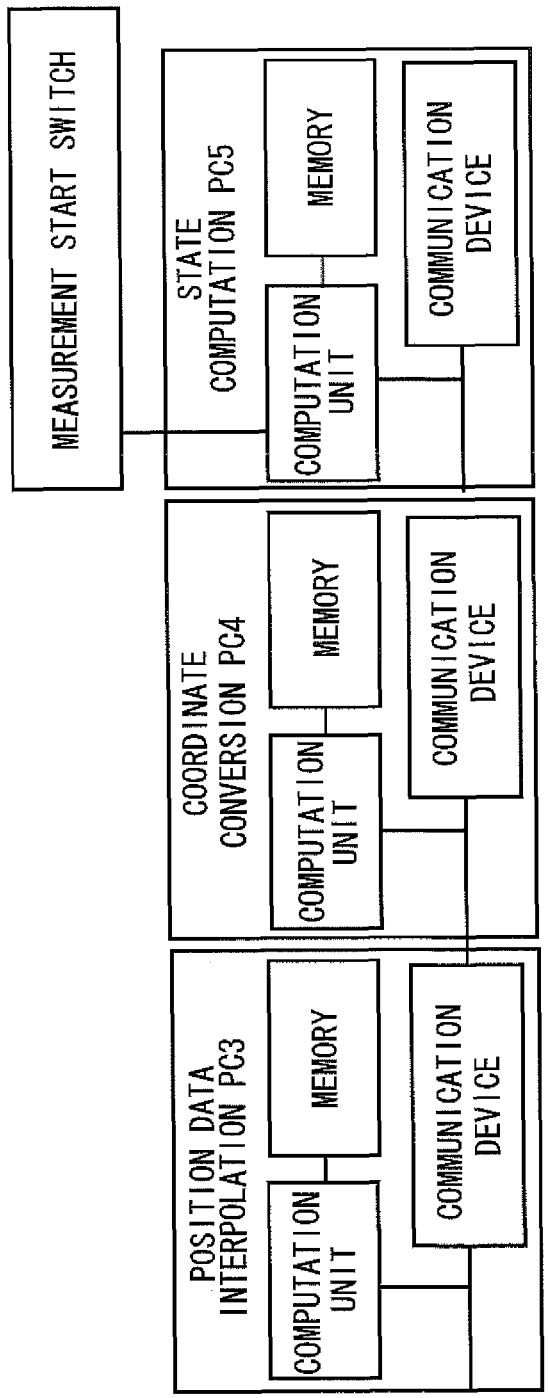
FIG. 3 is a diagram of a hardware configuration according to the first exemplary embodiment of the present invention.

The computation unit 20 includes a position data interpolation unit 22, a coordinate conversion unit 24, and a state computation unit 26. An example of a hardware configuration of the computation unit 20 is illustrated in FIG. 3. The processing of the position data interpolation unit 22 is implemented by a position data interpolation PC 3. The processing of the coordinate conversion unit 24 is implemented by a coordinate conversion PC4. The processing of the state computation unit 26 is implemented by a state computation PC5.

Based on the 3D position data for each of the sensors 10A to 10I at each of the specific periods of time received by the input unit 18, and based on the predetermined relative distances L between the adjacently installed sensors, the position data interpolation unit 22 interpolates 3D position data for each of interpolation positions on line segments that connect sensors, for each of the specific periods of time and between each of the adjacently installed sensors. The position data interpolation unit 22 also outputs the obtained 3D position data for each of the interpolation positions on line segments that connect sensors for between each of the adjacently installed sensors to the coordinate conversion unit 24.

Interpolation Processing Principles

Explanation follows regarding the principles of processing by which the position data interpolation unit 22 interpolates the 3D coordinate data of each of the interpolation positions between sensors. Generally shape measurement precision is higher the narrower the installation spacing between each of the sensors. However, making the installation spacing between sensors narrower increases signal processing volume, makes the measurement time longer, and moreover tends to have an adverse effect of increasing the rigidity of the measurement target. It is accordingly preferable for the installation spacing between sensors to be as wide as possible. The position data interpolation unit 22 enables measurement precision, namely reproducibility precision of the deformed shape of the measurement target object, to be increased without increasing the rigidity of the measurement target by interpolating the 3D position data of each of the interpolation positions on connecting line segments between widely installed sensors. Interpolation may employ various functions, such as a spline function. Explanation follows regarding a case in which interpolation is made for the interval of sensors n-m, for two sensors n and m illustrated in FIG. 4.

Figure 4:
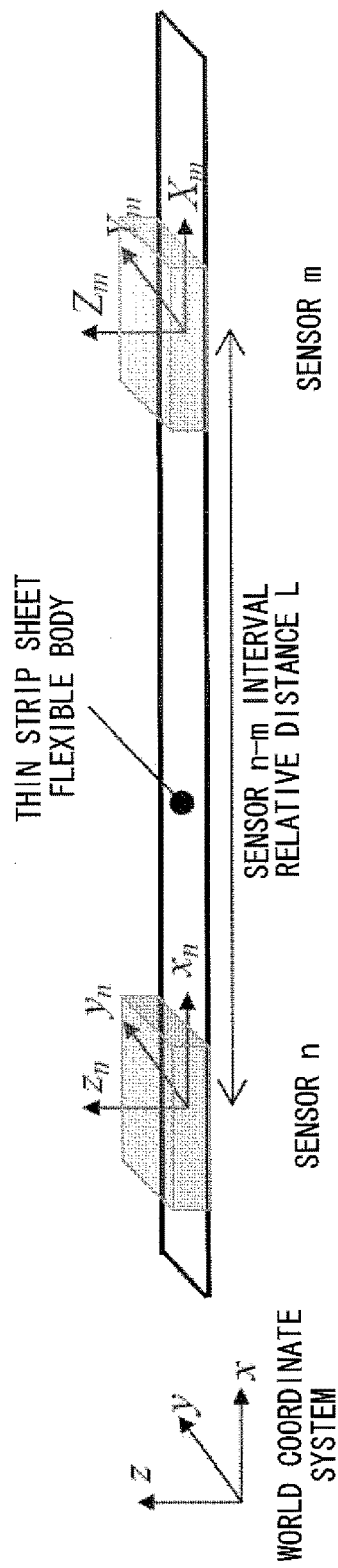
FIG. 4 is a diagram illustrating an example of a configuration in which a sensor n and a sensor m are installed at a thin strip sheet flexible body.
Figure 5:
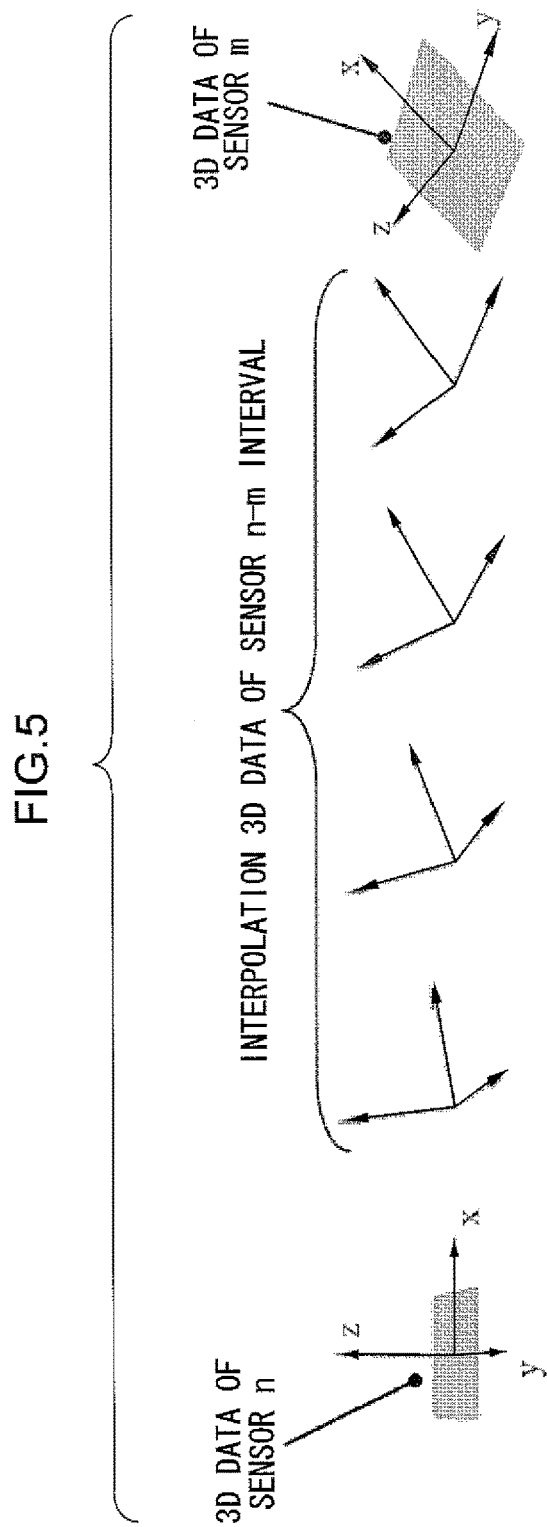
FIG. 5 is a diagram of an example of interpolation of 3D coordinate data.

As illustrated in FIG. 4, explanation follows regarding an example of a configuration in which a sensor n and a sensor m are installed on a thin sheet flexible body as the measurement target object. L is the relative distance of the sensor interval n-m in an initial state. The rotation angles about each of the axes in the world coordinate system axes for each of the sensors are denoted $\alpha$, $\beta$, and $\theta$. The orientation of the sensors is expressed by $\alpha$, $\beta$, and $\theta$. The orientation to the sensor n and the sensor m is assumed to change continuously as illustrated in FIG. 5. Such an assumption is valid, for example, from the perspective of the change in shape observed when bending or twisting a sheet deformation body such as that illustrated in FIG. 4.

Figure 6:
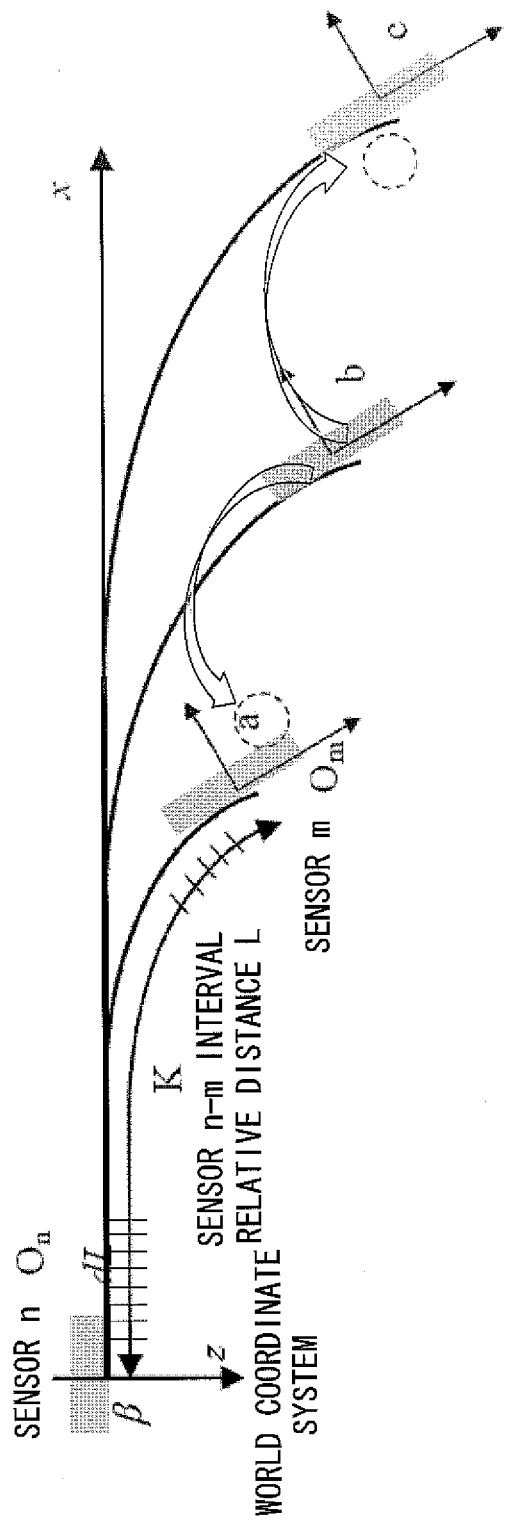
FIG. 6 is a diagram illustrating an example of a case in which axial rotation is only performed on one axis.

For simplification purposes, consider the case such as that of FIG. 6 in which there is only axial rotation in $\beta$. The deformation of the flexible body in such a case is within the x-z plane in FIG. 4. The origins of the coordinate systems for the sensor n and the sensor m are respectively denoted $O_n$ and $O_m$. A unit length when the relative distance L between sensors is divided into a given K equivalent segments is denoted dL.

$\beta$ is assumed to change continuously with respect to dL. Thus the value for each dL is derived using an interpolation function. A spline function is, for example, employed as the interpolation function. An outline of such a case is given below. The interpolation function is, however, not limited to being a spline function. Depending on the measurement conditions, the interpolation function may employ another interpolation function, such as a Lagrange polynomial function, or a curved surface function. In the first exemplary embodiment, the interpolation function employs a (2M−1) order spline interpolation function.

Explanation follows regarding an example in which a (2M−1) order spline interpolation function is employed as the interpolation function. The data in such a case is denoted $(x_0, y_0), (x_1, y_1), \ldots, (x_{n-1}, y_{n-1})$, wherein x is the relative distance L between sensors, and y is $\alpha$, $\beta$, $\theta$ and the 3D coordinate value of the sensor. Taking the end-point condition of the function, this being the $\beta$ value, $$s^l(x_0) = f^{(l)}(x_0)$$

$$s^l(x_{N-1}) = f^{(l)}(x_{N-1}) \ (l=1,2,\ldots,M-1)$$

and employing a B spline as the spline function s(x), gives the following Equation (1).

$$s(x) = \Sigma_{i=0}^{N+2M-3} \alpha_i B_{i,2M}(x) \quad (1)$$

Computation of the spline function is performed for each row of the sensors.

More specifically, $\beta$ in the world coordinate system axes for each of the interpolation positions on the connecting line segment between sensor $O_n$ and sensor $O_m$ is computed according to Equation (1) based on the respective $\beta$ for the sensor $O_n$ and the sensor $O_m$. The respective $\alpha$, $\theta$, and sensor 3D coordinate values are computed similarly. The position data interpolation unit 22 is accordingly able to obtain $\alpha$, $\beta$, $\theta$ and the 3D coordinate values in the world coordinate system axes for each of the interpolation positions on line segments that connect sensors.

At each of the specific periods of time, the coordinate conversion unit 24 computes the 3D coordinate values for each of the positions expressing the overall shape of the measurement target object, based on the 3D position data for each of the sensors 10A to 10I received by the input unit 18, the 3D position data input by the position data interpolation unit 22 for each of the interpolation positions on line segments that connect sensors for between each of the adjacently installed sensors, and the predetermined relative distance L between each of the sensors. The coordinate conversion unit 24 constructs the overall shape of the measurement target object based on the computed results at each of the specific periods of time, and stores the construction in memory (not illustrated in the drawings). The coordinate conversion unit 24 then outputs the overall shape of the measurement target object constructed at each of the specific periods of time to the state computation unit 26.

The state computation unit 26 computes a change amount and a change velocity at each of the specific periods of time based on the overall shape of the measurement target object at each of the specific periods of time input from the coordinate conversion unit 24. The state computation unit 26 outputs the computed result to the output unit 90.

Figure 7:
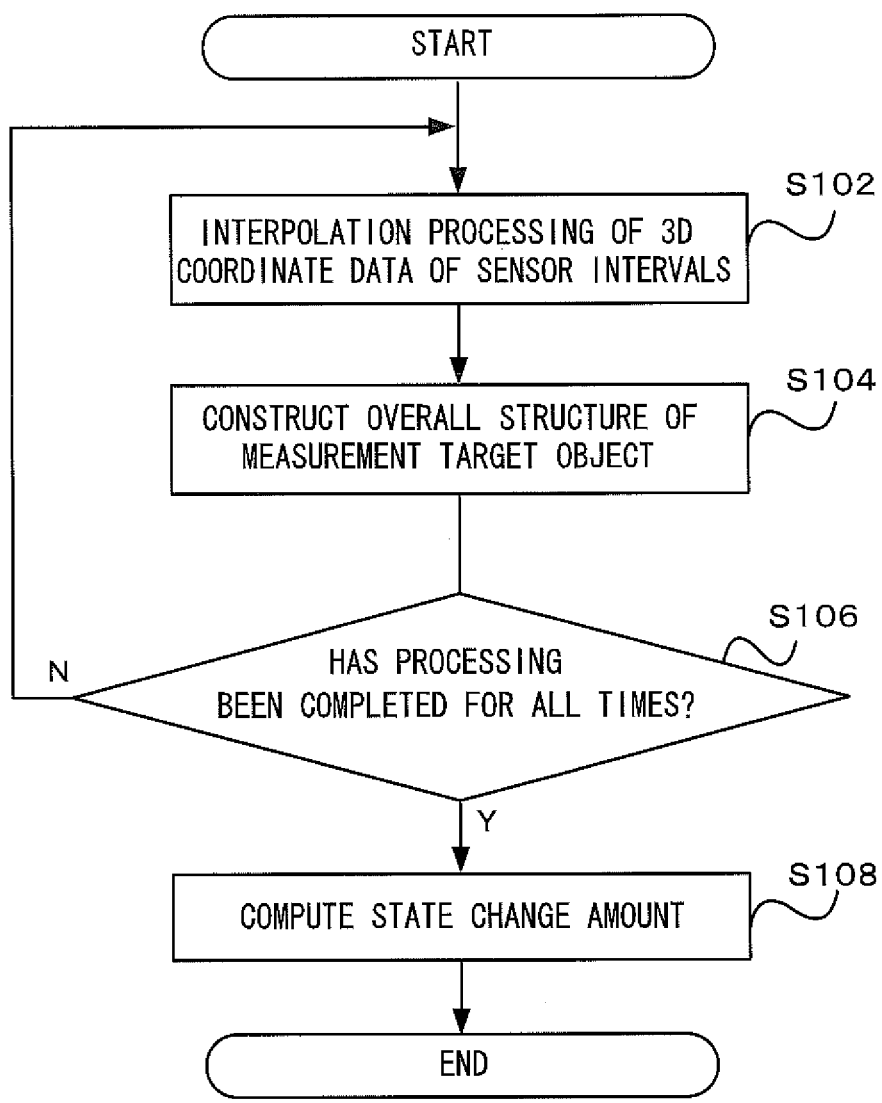
FIG. 7 is a flowchart illustrating content of a deformation analysis processing routine in a deformation analysis apparatus according to the first exemplary embodiment of the present invention.

Operation of the Deformation Analysis Apparatus According to the First Exemplary Embodiment Explanation next follows regarding operation of the deformation analysis apparatus 100 according to the first exemplary embodiment. First, when measuring the 3D position data of each of the sensors and outputting to the input unit 18 for each of the sensors 10A to 10I at each of the specific periods of time from the initial state, an operator switches ON a measurement start switch of the deformation analysis apparatus 100. When this is performed, the deformation analysis apparatus 100 receives the 3D position data for each of the sensors 10A to 10I at each of the specific periods of time using the input unit 18, and stores the 3D position data in the memory. Then after the end of the measurement period, a deformation analysis processing routine as illustrated in FIG. 7 is executed by the deformation analysis apparatus 100. Note that the times subject to processing in the deformation analysis apparatus 100 are selected in time series sequence.

First, at step S102, the position data interpolation unit 22 computes the 3D position data of each of the interpolation positions on line segments that connect sensors according to Equation (1) for between each of the adjacent sensors, based on the 3D position data for each of the sensors 10A to 10I received by the input unit 18 for the time subject to processing, and based on the predetermined relative distance L between adjacent sensors.

Then at step S104, the coordinate conversion unit 24 computes the 3D coordinate values for each position expressing the overall shape of the measurement target object for the time subject to processing, based on the 3D position data for each of the sensors 10A to 10I received by the input unit 18 for the time subject to processing, based on the 3D position data of each of the interpolation positions on line segments that connect sensors between each of the adjacent sensors acquired at step 102 for the time subject to processing, and based on the predetermined relative distance L between adjacent sensors. The coordinate conversion unit 24 constructs the overall shape of the measurement target object based on the computation results.

Then at step S106, the coordinate conversion unit 24 determines whether or not the processing of step S102 to step S104 has been completed for the all of the times subject to processing. The coordinate conversion unit 24 transitions to step S108 when determined that the processing of step S102 to step S104 has been completed for all the times subject to processing. However, the coordinate conversion unit 24 transitions to step S102 when determined that the processing of step S102 to step S104 has not been completed for all the times subject to processing, changes the times subject to processing, and repeats the processing from step S102 to step S106, changing the time subject to processing.

Then at step S108, the state computation unit 26 computes an amount of change in state, such as change or strain, in the measurement target object at each of the specific periods of time, based on each of the overall shapes of the measurement target object at each of the specific periods of time acquired at step S104. The state computation unit 26 outputs the computed result to the output unit 90, and ends the deformation analysis processing routine.

As explained above, according to the deformation analysis apparatus according to the first exemplary embodiment of the present invention, deformation analysis of a measurement target object can be performed at high precision by interpolating the 3D coordinate values and the rotation angles at each of the specific periods of time for each of the interpolation positions on line segments that connect sensors, based on the respective 3D coordinate values and rotation angles for plural sensor installation positions measured at each of the specific periods of time, and computing the 3D coordinate values of each position expressing the 3D shape of the measurement target object at each of the specific periods of time.

The deformation analysis apparatus acquires the 3D position data by installing the sensors 10A to 10I that acquire the 3D position data on a three dimensional surface or within a solid body. The deformation analysis apparatus is accordingly able to measure with high precision even in cases in which twisting of the measurement target object occurs.

The respective sensors 10A to 10I may be formed by a freely selected combination of tri-axial acceleration sensors, tri-axial angular acceleration sensors, and tri-axial geomagnetic sensors employing, for example, micro electro mechanical systems (MEMS). The deformation analysis apparatus is also able to compute states of, for example, deformation and strain of the measurement target object by discrete installation of these sensors at specific positions on the measurement target object.

The deformation analysis apparatus interpolates the 3D coordinate values and the rotation angles for each of the interpolation positions between sensors. The deformation analysis apparatus is accordingly capable of performing measurements with higher precision for such a number of installed sensors.

In the deformation analysis apparatus the sensors do not require visual data when measuring. It is accordingly possible to measure in cases in which the measurement face of the measurement target object makes contact with another object surface, or in cases in which the measurement target object is inside another body.

Figure 8:
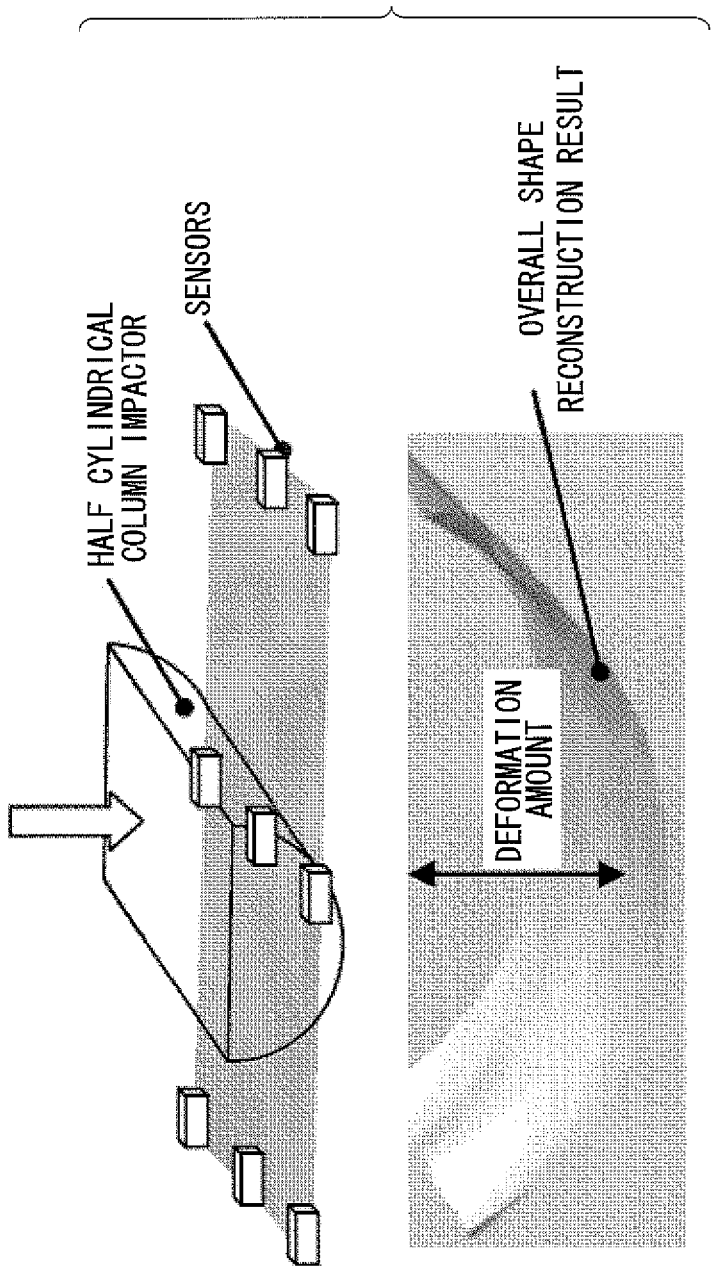
FIG. 8 is a diagram illustrating an example of shape construction.

Moreover, FIG. 9 illustrates an example in which the overall shape is constructed as a known half cylindrical column shape as illustrated in FIG. 8, a deformation analysis apparatus according to the first exemplary embodiment is employed, and results measuring the effect on a dummy abdominal region surface shape from a lap belt path are examined. When this is performed, as illustrated in FIG. 8 and FIG. 9, the deformation analysis apparatus according to the first exemplary embodiment is capable of measuring changes in shape of the abdominal region surface from different belt lines. From the results, the deformation analysis apparatus according to the first exemplary embodiment is capable of application to analyzing the injury mechanism in a submarining phenomenon, which has hitherto been difficult to measure and evaluate.

Moreover, there is a possibility of damage occurring to a human body due to the deformation amount and deformation speed when an external force acts on the abdominal region of a human body. Thus it can be expected that application can be made to performance evaluation of protection devices by using computation amounts of the deformation amount and deformation speed computed by the deformation analysis apparatus. Moreover, the deformation analysis apparatus is capable of computing stress and strain using the 3D coordinate data of specific points. This thereby enables the deformation analysis apparatus to perform evaluations using values of stress and strain.

The deformation analysis apparatus enables experimental measurements to be obtained of changes over time in 3D deformation and stress and strain for an abdominal region that have hitherto been limited to evaluation by a computer using a finite element analysis model of the human body. Thus the deformation analysis apparatus is able to perform with high precision experimental evaluation with real equipment for tests that hitherto employed evaluation indices, such as of acceleration and angular velocity.

Figure 10A:
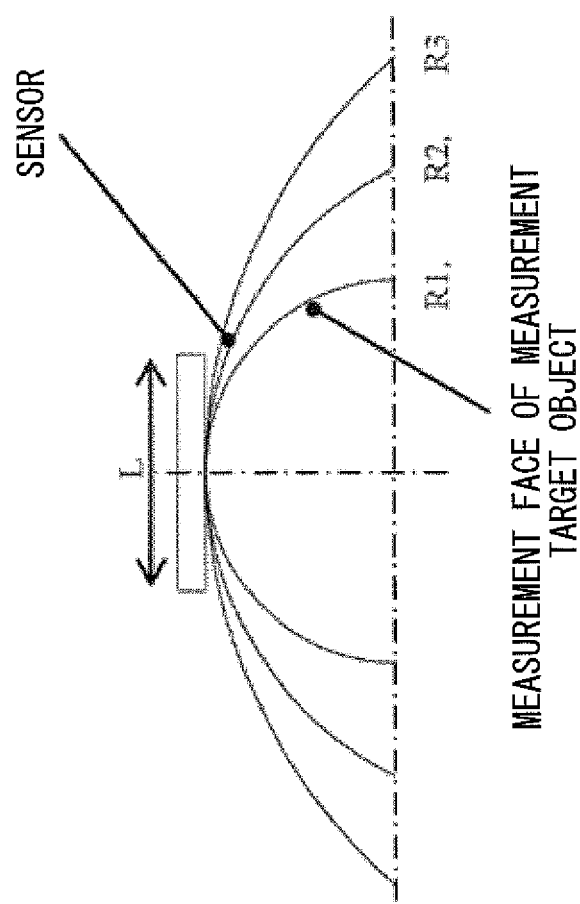
FIG. 10A is a diagram illustrating an example of a relationship between external dimensions of a sensor and a measurement face of a measurement target object.
Figure 10B:
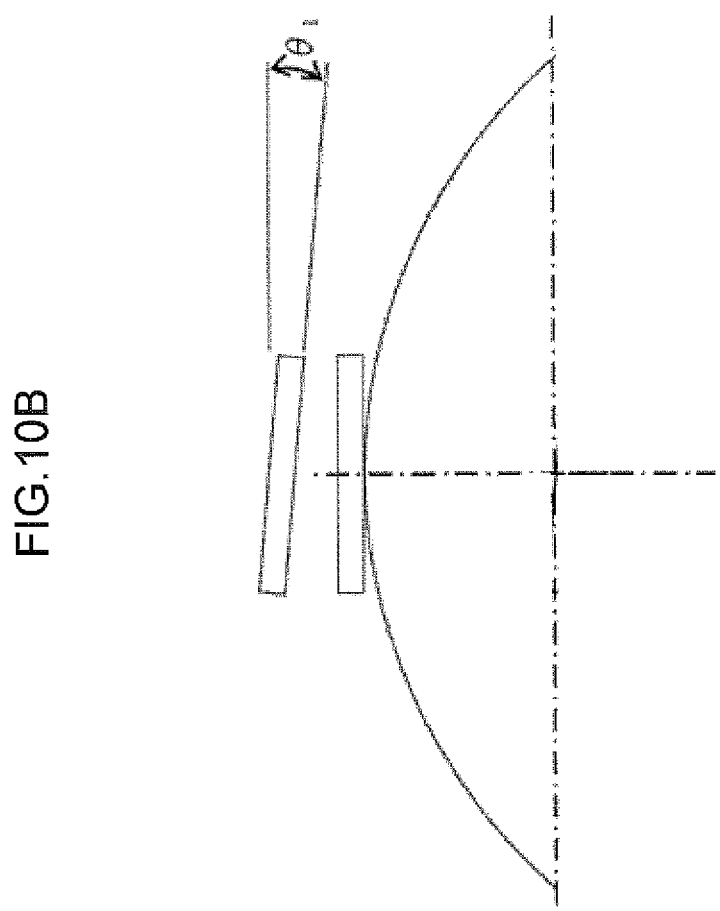
FIG. 10B is a diagram illustrating an example of a relationship between external dimensions of a sensor and a measurement face of a measurement target object.

Explanation follows regarding the effect of the outer shape on attachment of the sensors at L, with reference to FIG. 10A, FIG. 10B, and FIG. 10C. The measurement face of the measurement target object is, for example, changes as shown by R1, R2, and R3 according to the deformation condition of the target object as illustrated in FIG. 10A. L is fixed, and so when R is large compared to L as illustrated in FIG. 10B, the angle of slope when the sensor oscillates on the measurement face is θ1. In contrast thereto, when R is small compared to L as illustrated in FIG. 10C, the angle of slope is θ2. In actual measurements, the contact angle of the sensor to the measurement face fluctuates with oscillation, and in the case of FIG. 10C, compared to FIG. 10B, the amount of fluctuation in angle in the sensor position data is larger due to θ1<θ2, leading to a large change in the overall shape. However, when L is much larger than R, sometimes changes in R cannot be measured appropriately. There is accordingly a need to appropriately set L according to the size of R in order keep change in the overall shape to a specific amount or below and to sensitively measure changes in R. In the first exemplary embodiment, the ratio of the size of L to R is set by experimentation to 0.1 to 0.3.

The present invention is not limited to the above exemplary embodiment, and various modifications and applications are possible within a scope not departing from the spirit of the present invention.

For example, in the first exemplary embodiment, explanation has been given of a case in which the deformation analysis apparatus derives the 3D coordinate values and rotation angles of the sensors from the acceleration and angular velocity of the sensors; however there is no limitation thereto. For example, the deformation analysis apparatus may derive the 3D coordinate values and rotation angles of the sensors by employing sensors capable of detecting a gravity vector, or sensors capable of detecting the geomagnetism, as the sensors.

Explanation has been given in the first exemplary embodiment of a case in which the respective sensors are coupled together by the coupling body, and installed in a lattice shape on the measurement target object, however there is no limitation thereto. For example, the respective sensors may be individually installed on the measurement target object. The respective sensors may also be coupled together to form a different shape to a lattice shape and installed on the measurement target object.

Explanation next follows regarding a deformation analysis apparatus according to a second exemplary embodiment.

In the second exemplary embodiment, the deformation analysis apparatus differs from the first exemplary embodiment by estimating the relative distance L between sensors changed by change in shape of the measurement target object. Configuration and operation similar to that of the deformation analysis apparatus according to the first exemplary embodiment is appended with the same reference numerals, and duplicate explanation will be omitted thereof.

Configuration of a Deformation Analysis Apparatus According to the Second Exemplary Embodiment Explanation first follows regarding a configuration of a deformation analysis apparatus according to a second exemplary embodiment of the present invention. As illustrated in FIG. 11, a deformation analysis apparatus 200 according to an exemplary embodiment of the present invention may be configured by a computer including a CPU, RAM, and ROM stored with a program that executes a deformation analysis processing routine, described below, and various data. As illustrated in FIG. 11, the deformation analysis apparatus 200 functionally includes sensors 10A to 10I, an input unit 18, a computation unit 220, and an output unit 90.

The sensors 10A to 10I are respectively installed in a lattice shape on an abdominal region surface of a crash test dummy as the measurement target object. The respective sensors 10A to 10I are deformable, and are coupled to a coupling body capable of extending and contracting. A relative distance L along the deformed shape between installation positions of at least two adjacently installed sensors extends or contracts according to deformation of the measurement target object. The measurement target object according to the second exemplary embodiment is a flexible body.

The computation unit 220 is configured including a position data interpolation unit 222, a distance estimation unit 223, a coordinate conversion unit 224, and a state computation unit 26. FIG. 3 illustrates an example of a hardware configuration of the computation unit 220. Processing of the position data interpolation unit 222, and of the distance estimation unit 223 is implemented by a position data interpolation PC3. The processing of the coordinate conversion unit 224 is implemented by a coordinate conversion PC4. The processing of the state computation unit 26 is implemented by a state computation PC5.

The input unit 18 receives 3D position data for each of the sensors 10A to 10I received for each specific period of time, and stores the 3D position data in memory (not illustrated in the drawings).

At each of the specific periods of time, the position data interpolation unit 222, similarly to the position data interpolation unit 22 in the first exemplary embodiment, computes for each sensor interval the 3D position data of each of the interpolation positions on line segments that connect sensors based on the 3D position data for each of the sensors 10A to 10I stored in the memory (not illustrated in the drawings), and based on the relative distance L between each of the sensors. The position data interpolation unit 222 also outputs the computed 3D position data for each of the interpolation positions on line segments that connect sensors for each of the sensor intervals to the distance estimation unit 223 and the coordinate conversion unit 224. The position data interpolation unit 222 outputs the relative distance L between the sensors, estimated for each of the sensor intervals at each of the specific periods of time by the distance estimation unit 223, described below, to the coordinate conversion unit 224.

Based on the relative distance L between each of the sensors stored in the memory (not illustrated in the drawings), and based on the 3D position data of each of the interpolation positions on line segments that connect sensors for each of the sensor intervals input by the position data interpolation unit 222, the distance estimation unit 223 estimates at each of the specific periods of time the relative distance L between each of the sensors that has changed by deformation of the measurement target object.

Principles of Estimating the Relative Distance L Between Sensors

Explanation follows regarding the principles of processing by which the distance estimation unit 223 estimates the relative distance L between sensors. More specifically, as illustrated in FIG. 4, explanation follows regarding an example of a configuration in which a sensor n and a sensor m are installed on a thin sheet flexible body.

As illustrated in FIG. 4, explanation follows regarding an example of a configuration in which a sensor n and a sensor m are installed on a thin sheet flexible body. L is the relative distance of the sensor interval n-m between the sensor n and the sensor m in the initial state. The rotation angles about each of the axes in the world coordinate system axes for each of the sensors are denoted $\alpha$, $\beta$, and $\theta$. The orientation of the sensors is expressed by $\alpha$, $\beta$, and $\theta$. The orientation to the sensor n and the sensor m is assumed to change continuously with respect to the relative distance L between sensors, as illustrated in FIG. 5. Such an assumption is valid, for example, from the perspective of the change in shape observed when bending or twisting a sheet deformation body such as that illustrated in FIG. 4.

For simplification purposes, consider the case such as that of FIG. 6 in which there is only axial rotation in $\beta$. The deformation of the flexible body in such a case is within the x-z plane in FIG. 4. The origins of the coordinate systems for the sensor n and the sensor m are respectively denoted $O_n$ and $O_m$. A unit length when L is divided into a given K equivalent segments is denoted dL. Since the rotation angle on the y axis is $\beta$, the x coordinate and the z coordinate in the segment [$k_i$, $k_{i+1}$] are respectively as given by following Equation (2) and Equation (3).

$$x_{k+1} - x_k = \mathrm{dL} \cdot \cos(\beta_k + \delta\beta_k/2) \quad (2)$$

$$z_{k+1} - z_k = \mathrm{dL} \cdot \sin(\beta_k + \delta\beta_k/2) \quad (3)$$

wherein $$\beta_k = \beta_0 + \int_0^{L_k}\left(\frac{d\beta}{dL}\right)dL$$

$$\delta\beta_k = \beta_{k+1} - \beta_k$$

$\beta_0$: end initial angle

Thus the position of $O_m$ with respect to $O_n$ is derived according to Equation (2) and Equation (3) based on the relative distance L between sensors, the measured $\beta$ at sensor n, and the interpolated $\beta$. In cases of 3D deformation in which rotation changes for vertices other than $\beta$, the position of $O_m$ with respect to $O_n$ is derived according to Equation (2) and Equation (3) based on $\alpha$ and $\theta$ respectively, from a similar way of thinking. Namely, in cases in which the orientation to the sensor n and the sensor m changes continuously with respect to the relative distance L between sensors as illustrated in FIG. 5, the position of $O_m$ with respect to $O_n$ is derived by repeatedly performing 3D coordinate conversion employing a conversion matrix of the same order for the coordinate systems set for each dL.

Consider a case in which the relative distance L between sensors changes due to a change in the shape of the measurement target object. The shape of the measurement target object for which an initial length L0 is obtained for the relative distance L between sensors is denoted state b in FIG. 6. The state when the relative distance L between sensors has been lengthened by $\delta L$ is denoted c. The state when the relative distance L between sensors has been shortened by $\delta L$ is denoted a. The 3D coordinate values of $O_m$ on the world coordinate system axes change in the state c due to the relative distance L between sensors changing from the initial length L0 to L0+$\delta$L. Thus when the shape (the 3D coordinate values in the world coordinate system axes of the $O_m$) is computed from Equation (2) and Equation (3) using the initial length L0 of the relative length between the sensors, then an error arises according to +$\delta$L. Similarly, the 3D coordinate values of $O_m$ also change when the relative distance between sensors changes from the initial length L0 to L0-$\delta$L, with an error arising according to -$\delta$L. In order to not cause such an error $\delta$L needs to be derived and L corrected.

More specifically, the change amount $\delta$L is obtained as displacements $\delta$x, $\delta$y, $\delta$z that are the displacement amounts in the world coordinate system axes. As a method for deriving $\delta$x, $\delta$y, $\delta$z, they may be computed from the change in the amounts of the displacement and the rotation angle measured by the sensor m. For example, $\delta$x, $\delta$y, and $\delta$z may be derived by integrating each axis component of the displacement amount and translation acceleration of the acceleration sensor corrected by the rotation angle. Note that these are performed by general physical transformations. Namely, the coordinate value H (x, y, z) in the world coordinate system axes of the $O_m$ coordinate measured by the sensor m is obtained as H' (x+$\delta$x, y+$\delta$y, z+$\delta$z). Explanation follows of a case in which $O_n$ is the origin of the world coordinate system axes, and has a position that does not move. In the second exemplary embodiment, H' employs the 3D coordinate values from out of the 3D position data for each of the sensors received by the input unit 18.

Then, taking the $O_n$ coordinate of sensor n as the origin, the 3D coordinate values R ($x_c$, $y_c$, $z_c$) of the sensor $O_m$ in the world coordinate system axes are computed according to Equation (2) and Equation (3). At this stage computation is performed employing the relative distance L of sensor interval n-m employed for processing the previous time, or the initial length. The computation result obtained for the 3D coordinate values R ($x_c$, $y_c$, $z_c$) of the sensor $O_m$ in the world coordinate system axes is then compared with the 3D coordinate values H' (x+$\delta$x, y+$\delta$y, z+$\delta$z) in the world coordinate system axes acquired as described above. If the comparison result is that the difference between the two values is within a specific error (for example, within the intermittent lines of FIG. 6), then the relative distance L of sensor interval n-m employed for processing the previous time, or the initial length, is estimated as the relative distance L between sensors and stored in memory (not illustrated in the drawings). Note that the relative distance L between sensors or the initial length are examples of candidate values employed in Equation (2) and Equation (3).

However, if the difference between the two values is greater than the specific error, the distance estimation unit 223 corrects the relative distance L between sensors. For example, when $x_c$<x+$\delta$x, the distance estimation unit 223 increases the relative distance L between sensors since the state c in FIG. 6 exists. When $x_c$>x+$\delta$x, the distance estimation unit 223 reduces the relative distance L between sensors since the state a in FIG. 6 exists. Thus the distance estimation unit 223 performs convergence computation by repeatedly performing the above correction processing of the relative distance L between sensors, computing of the 3D coordinate values R, and comparing the 3D coordinate values H' with the 3D coordinate values R, while changing the relative distance L between sensors, until the difference between the two values is within the specific error. In the convergence computation, the convergence conditions are varied according to the correction amount to relative distance L, however the correction amount may be a fixed value, or may be varied according to the difference between the two values.

The coordinate conversion unit 224 is input by the position data interpolation unit 222, and for each of the specific periods of time, based on the 3D position data for each of the sensors 10A to 10I, the 3D position data at each of the specific periods of time of each interpolation position on line segments that connect sensors for between each of the adjacently installed sensors, and the relative distance L of sensor interval n-m employed for processing the previous time, or the relative distance L of each sensor interval at each of the specific periods of time estimated by the distance estimation unit 223, the coordinate conversion unit 224 computes the 3D coordinate values of each of the positions expressing the overall shape of the measurement target object at each of the specific periods of time. Then, based on the computed result at each of the specific periods of time, the coordinate conversion unit 224 constructs the overall shape at each of the specific periods of time and stores the constructed overall shapes in the memory (not illustrated in the drawings). The coordinate conversion unit 224 outputs the overall shape of the measurement target object constructed at each of the specific periods of time to the state computation unit 26.

Figure 12:
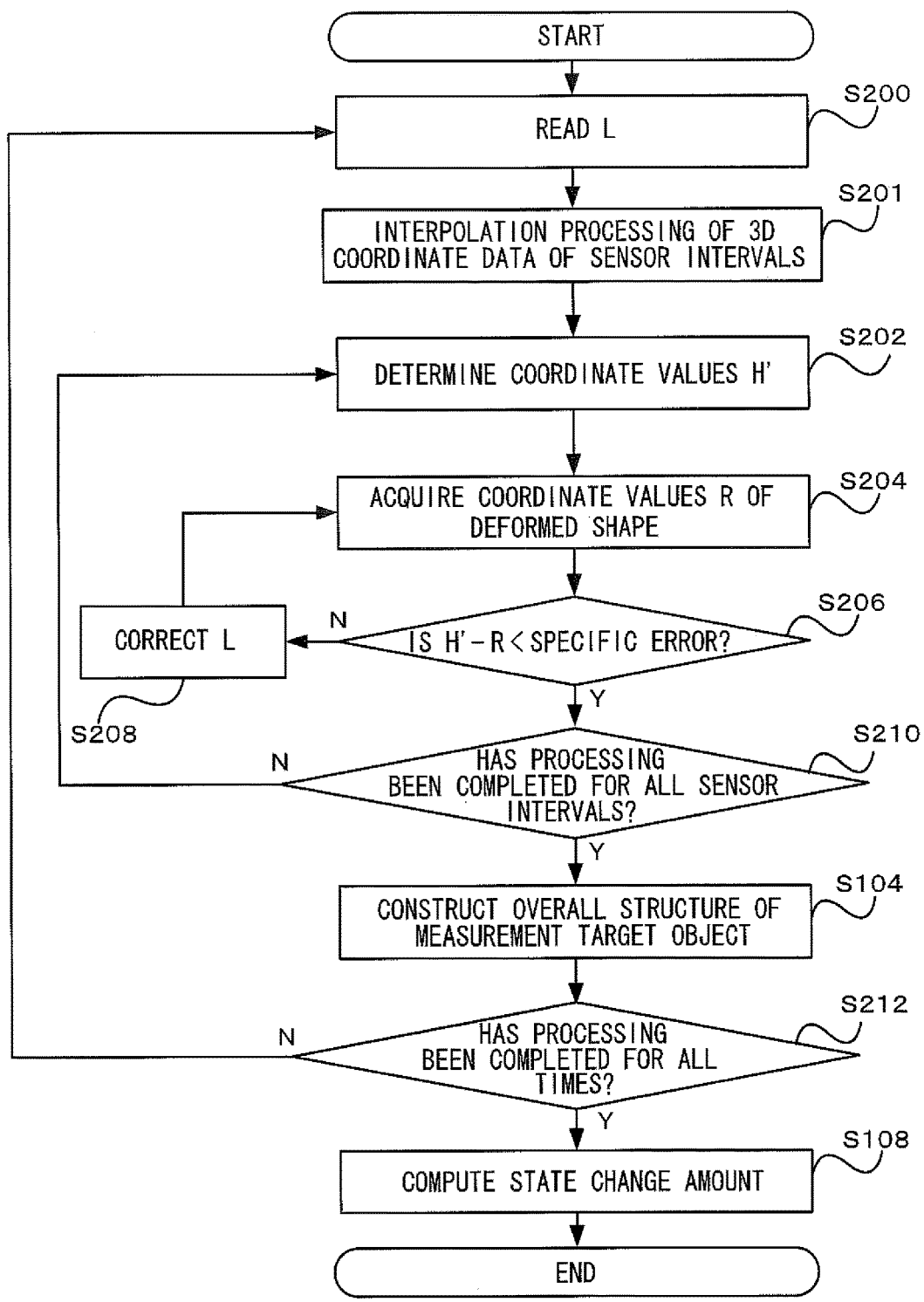
FIG. 12 is a flowchart illustrating content of a deformation analysis processing routine in a deformation analysis apparatus according to the second exemplary embodiment of the present invention.

Operation of Deformation Analysis Apparatus
According to Second Exemplary Embodiment Explanation next follows regarding operation of a deformation analysis apparatus 200 according to the second exemplary embodiment. First, when the respective sensors 10A to 10I are measuring the 3D position data of the sensors and outputting the measured data to the input unit 18 at each of the specific periods of time from the initial state, an operator switches ON a measurement start switch of the deformation analysis apparatus 100. When this is performed, the deformation analysis apparatus 200 receives the 3D position data for each of the sensors 10A to 10I at each of the specific periods of time using the input unit 18, and stores the 3D position data in the memory. Then after the end of the measurement period, a deformation analysis processing routine as illustrated in FIG. 12 is executed by the deformation analysis apparatus 200. Note that the times subject to processing in the deformation analysis apparatus 200 are selected in time series sequence.

At step S200, the position data interpolation unit 222 reads in the relative distances L of the respective sensor intervals that were determined the previous processing time, or predetermined, or the initial length, stored in the memory (not illustrated in the drawings).

Then at step S201, the position data interpolation unit 222 computes the 3D position data of each of the interpolation positions on line segments that connect sensors according to Equation (1) for between each of the adjacent sensors, based on the 3D position data for each of the sensors 10A to 10I received by the input unit 18 for the time subject to processing, and based on the predetermined relative distance L between each of the adjacent sensors acquired at step 200.

Then at step S202, the distance estimation unit 223 takes the 3D coordinate values in the world coordinate system axes of one of the sensors of the sensor interval received by the input unit 18 for the sensor interval subject to processing at the specific time subject to processing, as the 3D coordinate values H'.

Then at step S204, based on the 3D position data for each of the sensors included in the sensor interval received by the input unit 18, and based on the relative distance L for the sensor interval acquired at step S200, or the relative distance L for the sensor interval corrected at step S208, the distance estimation unit 223 computes for the sensor interval subject to processing at the specific time subject to processing the 3D coordinate values R in the world coordinate system axes of one of the sensors according to the Equation (2) and the Equation (3), taking the 3D coordinate values in the world coordinate system axes of the other sensor of the sensor interval as the base point.

Then at step S206, the distance estimation unit 223 determines for the sensor interval subject to processing whether or not the difference between the 3D coordinate values H' in the world coordinate system axes acquired at step S202 and the 3D coordinate values R in the world coordinate system axes acquired at step S204, is within a predetermined specific error. When determined to be within the predetermined specific error, the distance estimation unit 223 confirms the relative distance L between sensors, stores this in the memory (not illustrated in the drawings), and transitions to step S210. However, the distance estimation unit 223 transitions to step S208 when determined not to be within the predetermined specific error.

At step S208, based on the difference obtained at step S206, the distance estimation unit 223 corrects the relative distance L between sensors for the sensor interval subject to processing, and transitions to step S204.

At step S210, the distance estimation unit 223 determines whether or not processing of step S202 to step S206 is completed for all of the sensor intervals. The distance estimation unit 223 transitions to step S104 when determined that the processing from step S202 to step S206 has been completed for all of the sensor intervals. However, the distance estimation unit 223 changes the sensor interval subject to processing and transitions to step S202 when determined that the processing from step S202 to step S206 has not been completed for all of the sensor intervals.

At step S212, the coordinate conversion unit 224 determines whether or not processing has been completed for all the sensor intervals for the specific time subject to processing. The coordinate conversion unit 224 transitions to step S108 when determined that processing has been completed for all the sensor intervals. However, the coordinate conversion unit 224 changes the sensor interval subject to processing and transitions to step S200 when determined that the processing has not been completed for all of the sensor intervals.

As explained above, according to the deformation analysis apparatus of the second exemplary embodiment of the present invention, based on the 3D coordinate values and the rotation angles of each of the plural sensor installation positions measured at each of the specific periods of time, the 3D coordinate values and rotation angles are interpolated at each of the specific periods of time for each of the interpolation positions on line segments that connect sensors. The deformation analysis apparatus according to the second exemplary embodiment estimates the relative distance L between each of the sensors. The deformation analysis apparatus according to the second exemplary embodiment computes the 3D coordinate values for each of the positions expressing the 3D shape of the measurement target object at each of the specific periods of time. The deformation analysis apparatus according to the second exemplary embodiment is thereby able to perform deformation analysis of the measurement target object at high precision in cases in which the surface of the measurement target object is extended by change in the measurement target object.

Moreover, the deformation analysis apparatus estimates the relative distance L between sensors. The deformation analysis apparatus is accordingly able to measure with high precision even in cases in which the measurement target object is tiny, or the space in which measurement is performed is narrow.

The deformation analysis apparatus estimates the relative distance L between sensors. The deformation analysis apparatus is accordingly able to estimate the amount of change in the relative distance L even in cases when the measurement target object is a flexible body and expansion or contraction of the measurement face occurs, enabling the deformed shape to be corrected and computed according to the amount of change. The deformation analysis apparatus is thereby able to greatly reduce computation error in the deformed shape.

The present invention is not limited to the above exemplary embodiments, and various modifications and applications are possible within a range not departing from the spirit of the invention.

Figure 13A:
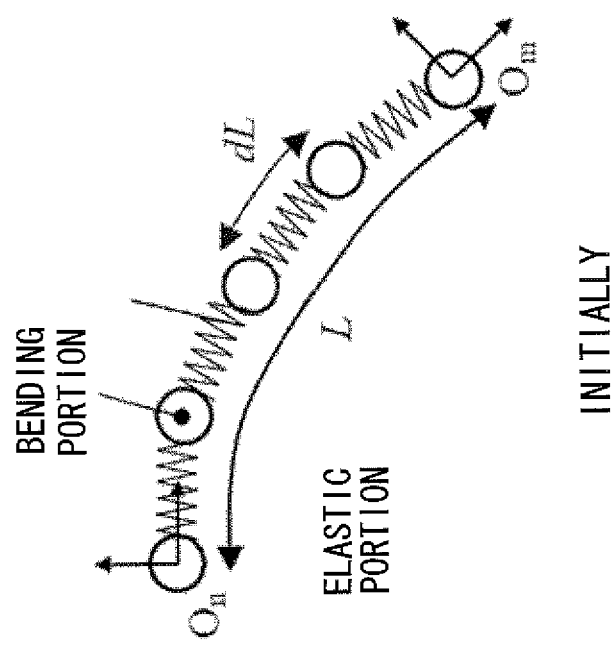
FIG. 13A is a diagram illustrating an example of computing a deformed shape using a computation module.
Figure 13B:
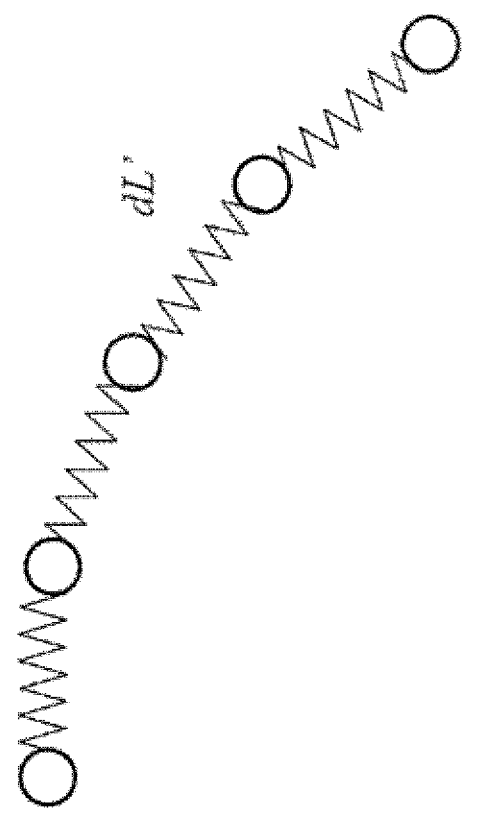
FIG. 13B is a diagram illustrating an example of computing a deformed shape using a computation module.

For example, in the second exemplary embodiment, the deformation analysis apparatus computes the deformed shape according to Equations (1) to (3); however, there is no limitation thereto, and the deformation analysis apparatus may compute the deformed shape using processing employing a computation model such as that illustrated in FIG. 13A and FIG. 13B. Specifically, the deformation analysis apparatus may employ a predefined computation model employing acceleration and angular velocity to estimate relative distance L between sensors based on the acceleration and angular velocity of each of the sensors. The computation model uses pairs of elastic portions of specific lengths dL and bending portions, and assigns specific elasticity characteristics and bending characteristics thereto. By assigning 3D coordinate values to each of the sensors placed at the two ends of the sensor intervals, elastic deformation and bending deformation occurs in each of the portions so as to converge on a stable form. When the difference between the deformation amount dL' of the elastic portions at convergence and the initial value dL is not within a specific value, this is treated as the length of L having changed from the initial length. The length dL of the elastic portions is thus changed according to the amount of change. In methods employing computation models, once converged on a stable form, corrections can be performed that agree comparatively well with predictions by obtaining a change amount in the length of L $\Sigma(dL'-dL)$. When employing computation models a digitalized acceleration is also received by the input unit 18 from each of the sensors 10A to 10I.

Explanation has been given of a case in the second exemplary embodiment in which the deformation analysis apparatus employs a method that integrates the acceleration measured by the sensors as the method of determining $\delta L$; however there is no limitation thereto. For example, the deformation analysis apparatus may employ a method in which a displaced shape is established by utilizing light, strain, or the like between the sensor n and the sensor m. The deformation analysis apparatus may also derive $\delta L$ from images obtained by setting up a camera or the like. In addition thereto, the deformation analysis apparatus may also measure $\delta L$ using magnetism or ultrasound.

Explanation next follows regarding a deformation analysis apparatus of a third exemplary embodiment.

A deformation analysis apparatus according to the third exemplary embodiment differs from the first exemplary embodiment and the second exemplary embodiment in the point that the measurement target object is a flat sheet body, extension occurs on the measurement face, and the attachment state of the sensors is a state in which the sensors are directly attached to the measurement target object. The same reference numerals are appended to configuration and operation similar to that of the deformation analysis apparatuses of the first and second exemplary embodiment, and explanation will be omitted thereof.

The relative distance L between sensors changes when the measurement target object is flexible and extension occurs. FIG. 14 illustrates combinations of measurement target object shapes, extension characteristics, and attachment methods of sensors to the measurement target object, with 8 combinations illustrated.

The deformation analysis apparatus either corrects, or does not correct, the relative distance L between sensors according to such combinations. The deformation analysis apparatus does not correct the relative distance L between sensors when there is no extension of the measurement face, or when there is an extremely small amount of extension of the measurement face with respect to the deformation of the measurement target object. There are accordingly 4 combinations in FIG. 14 where the deformation analysis apparatus corrects the relative distance L between sensors. Examples are illustrated in FIG. 15A and FIG. 15B where there is a tiny extension in the measurement face with respect to the deformation of the measurement target object. External force acts on the measurement target object, and the measurement target object changes from the shape prior to deformation of FIG. 15A to the shape after deformation of FIG. 15B. In such deformation of the measurement target object, for example, the change in the relative distance L between sensors is tiny when the measurement target object is paper, laminate film, or the like, and it is possible to ignore the change with respect to the change amount in the measurement target object.

Explanation follows regarding a case in the third exemplary embodiment in which the measurement target object is a flat sheet body, extension occurs in the measurement face, and there is a direct sensor attachment state.

Figure 16:
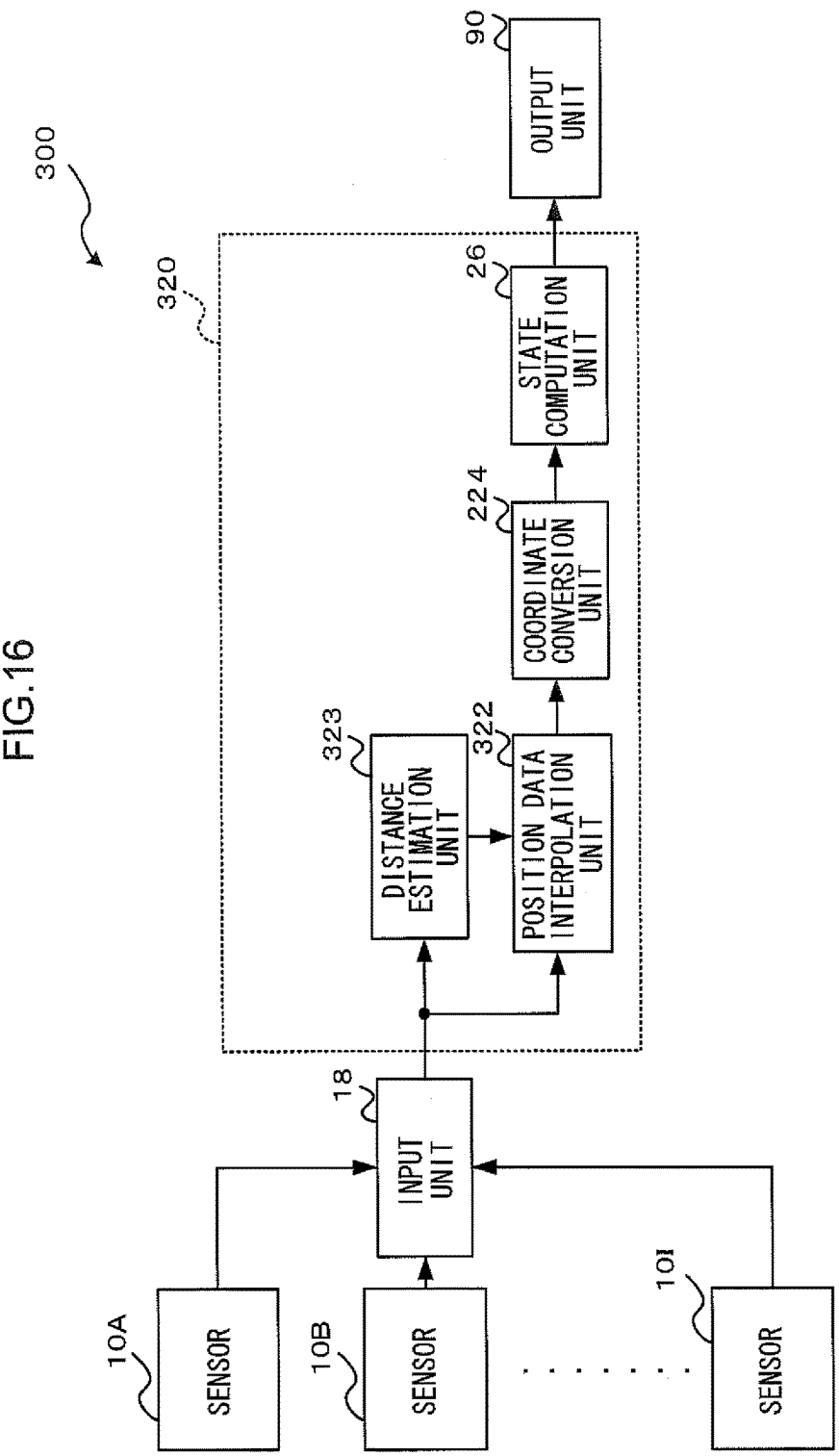
FIG. 16 is a block diagram illustrating a configuration of a deformation analysis apparatus according to a third exemplary embodiment of the present invention.

Configuration of Deformation Analysis Apparatus
of the Third Exemplary Embodiment Explanation first follows regarding configuration of the deformation analysis apparatus according to the third exemplary embodiment of the present invention. As illustrated in FIG. 16, a deformation analysis apparatus 300 according to the third exemplary embodiment of the present invention may be configured by a computer including a CPU, RAM, and ROM stored with a program that executes a deformation analysis processing routine, described below, and various data. As illustrated in FIG. 16, the deformation analysis apparatus 300 functionally includes sensors 10A to 10I, an input unit 18, a computation unit 320, and an output unit 90.

Each of the sensors 10A to 10I is installed in a lattice shape to the measurement target object that is a flat sheet body. A relative distance L along the deformed shape between installation positions of at least two adjacently installed sensors extends or contracts according to deformation of the measurement target object. The measurement target object according to the third exemplary embodiment is a flexible body.

The computation unit 320 is configured including a position data interpolation unit 322, a distance estimation unit 323, a coordinate conversion unit 224, and a state computation unit 26.

The position data interpolation unit 322, similarly to the position data interpolation unit 22 in the first exemplary embodiment, computes for each sensor interval the 3D position data of each of the interpolation positions on line segments that connect sensors based on the 3D position data for each of the sensors 10A to 10I stored in the memory (not illustrated in the drawings), and based on the relative distance L between each of the sensors at each of the specific periods of time. The position data interpolation unit 322 also outputs the computed 3D position data for each of the interpolation positions on line segments that connect sensors for each of the sensor intervals to the coordinate conversion unit 224. The position data interpolation unit 322 outputs the relative distance L between the sensors estimated for each of the sensor intervals at each of the specific periods of time acquired by the distance estimation unit 323, described below, to the coordinate conversion unit 224.

Based on the relative distance L between each of the sensors stored in the memory (not illustrated in the drawings), and based on a rotation angle θ out of 3D position data for each of the sensors 10A to 10I at each of the specific periods of time received by the input unit 18, the distance estimation unit 323 estimates at each of the specific periods of time the relative distance L between each of the sensors that has changed by deformation of the measurement target object. The distance estimation unit 323 also outputs the estimated results to the position data interpolation unit 322. θ is the rotation angle of an axis in the surface plane of axes orthogonal to a line segment on an extension line of the measurement target object.

Principles of Estimating the Relative Distance L Between Sensors

Figure 17:
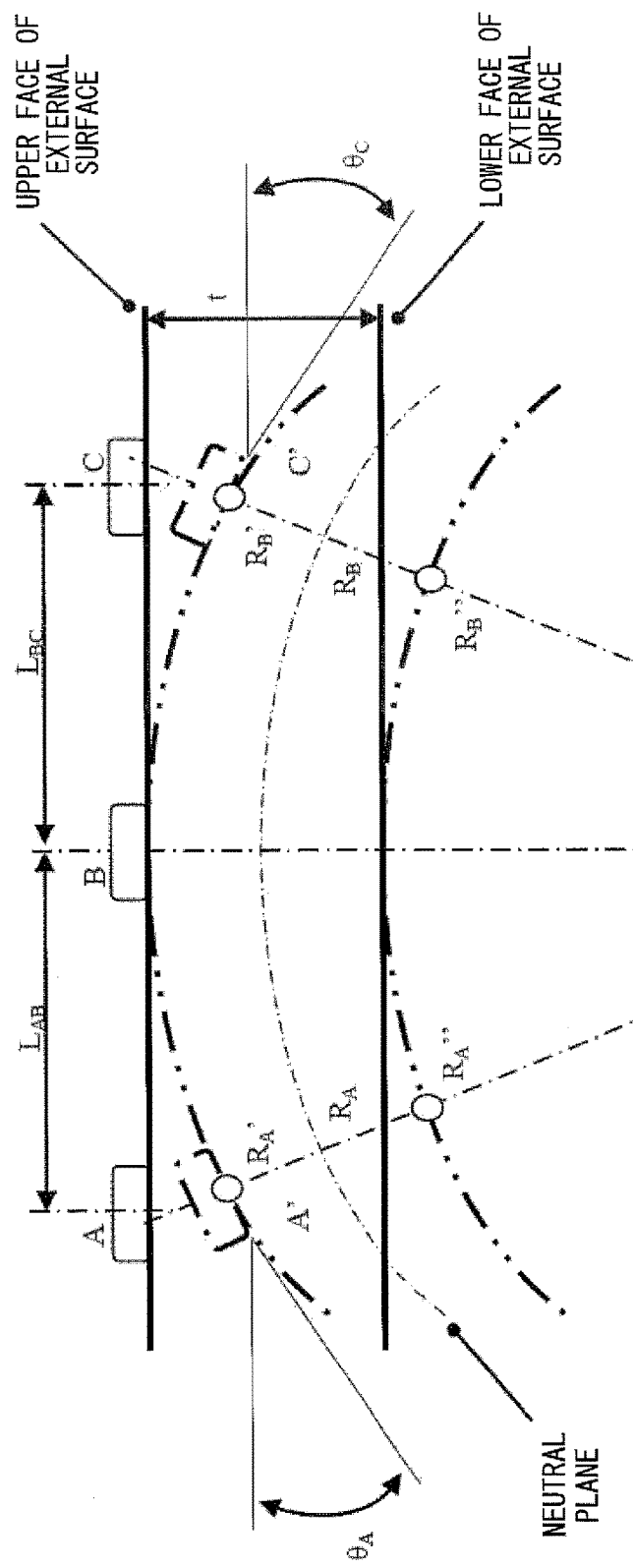
FIG. 17 is a diagram illustrating an example of relative distances between sensors in flat sheet deformation.

When extension occurs in the surface along with deformation of a flat sheet body, the interval between sensors changes according to the deformation of the flat sheet body. For example, sensors A, C attached to the upper face of a sensor external surface when a flat sheet is bulge-deformed about a central axis of sensor B as illustrated in FIG. 17 change in position to A', C'. The relative distances between sensors LAB and LBC accordingly elongate by lengths of $\Delta LAB = 2\pi RA' \cdot (\theta A/360) - LAB$, and $\Delta LBC = 2\pi RB' \cdot (\theta C/360) - LBC$. However the lower face of the sensor external surface shortens by amounts $\Delta LAB = 2\pi RA'' \cdot (\theta A/360) - LAB$, and $\Delta LBC = 2\pi RB'' \cdot (\theta C/360) - LBC$.

The change in relative distance L between sensors accompanying such flat sheet deformation is computed based on the rotation angle θ, and correction is performed.

Figure 18:
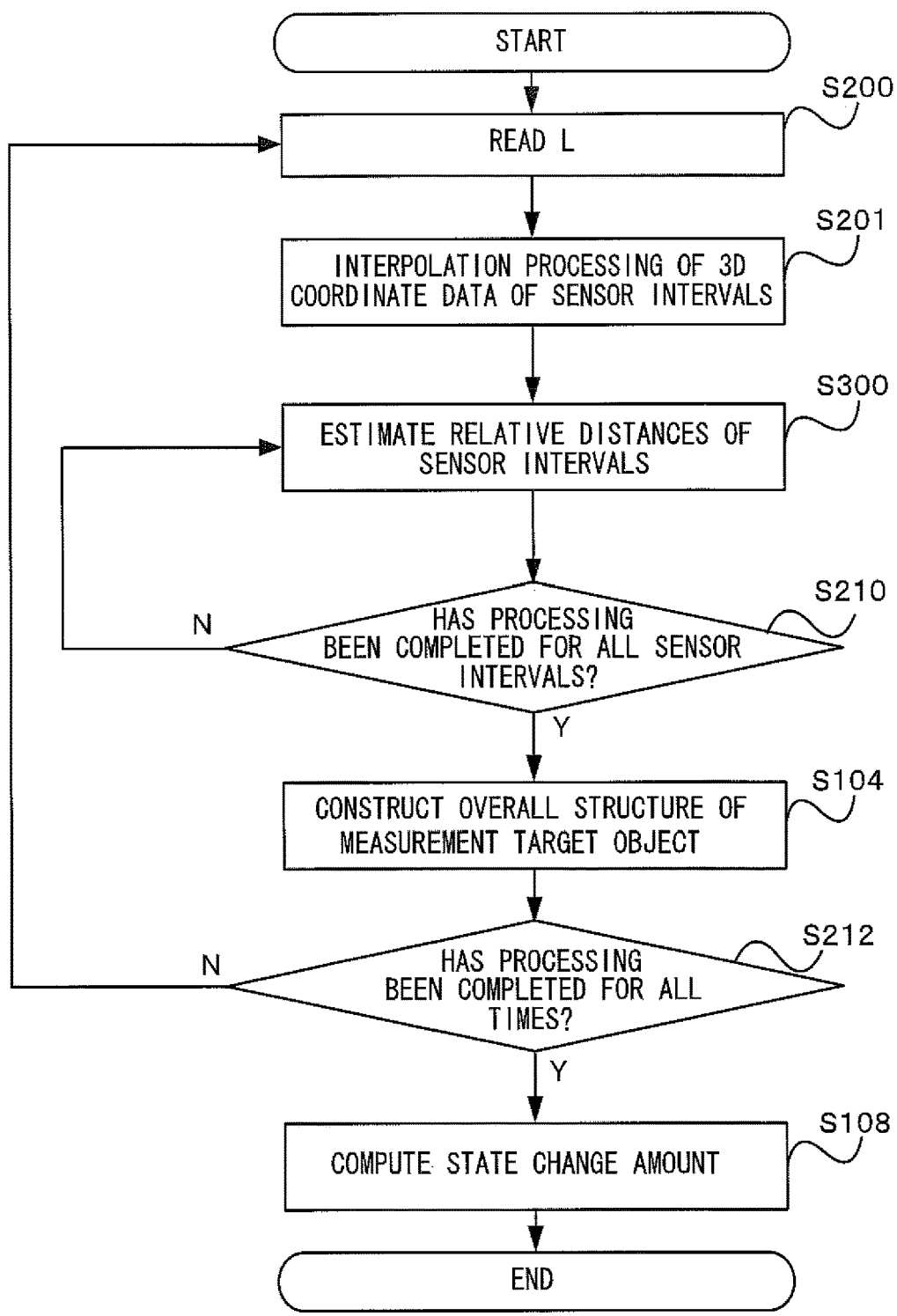
FIG. 18 is a flowchart illustrating content of a deformation analysis processing routine in a deformation analysis apparatus according to the third exemplary embodiment of the present invention.

Operation of the Deformation Analysis Apparatus According to the Third Exemplary Embodiment Explanation next follows regarding operation of the deformation analysis apparatus 300 according to the third exemplary embodiment. First, when measuring the 3D position data of each of the sensors and outputting to the input unit 18 for each of the sensors 10A to 10I at each of the specific periods of time from the initial state, an operator switches ON a measurement start switch of the deformation analysis apparatus 300. When this is performed, the deformation analysis apparatus 300 receives the 3D position data for each of the sensors 10A to 10I at each of the specific periods of time using the input unit 18, and stores the 3D position data in the memory. Then after the end of the measurement period, a deformation analysis processing routine as illustrated in FIG. 18 is executed by the deformation analysis apparatus 300. Note that the times subject to processing in the deformation analysis apparatus 300 are selected in time series sequence.

At step S300, the distance estimation unit 323 estimates the relative distance L of the sensor interval subject to processing based on the relative distance L or the initial length of each of the sensor intervals acquired at step S200, and based on the rotation angle θ for the 3D position data for each of the sensors 10A to 10I at the specific time subject to processing received by the input unit 18.

As explained above, according to the deformation analysis apparatus according to the third exemplary embodiment of the present invention, the 3D coordinate values and rotation angles are interpolated at each of the specific periods of time for each of the interpolation positions on line segments that connect sensors based on the 3D coordinate values and rotation angles of the respective installation positions of plural sensors measured at each of the specific periods of time, the relative distance L between each of the sensor intervals is estimated, and the 3D coordinate values of each of the positions expressing the 3D shape of the measurement target object at each of the specific periods of time is computed. This thereby enables deformation analysis of the measurement target object to be performed at high precision even in cases in which the surface of the measurement target object has extended by change in the measurement target object.

The present invention is not limited to the above exemplary embodiment, and various modifications and applications are possible within a scope not departing from the spirit of the present invention.

For example, although in the deformation analysis apparatus according to the third exemplary embodiment the relative distance L between sensors is estimated based on the rotation angle θ of the sensors, there is no limitation thereto. A neutral plane that does not change length in flat sheet deformation is situated between the sensor external surface upper and lower faces that are separated by a thickness t. The position of the neutral plane is, for example, a position of substantially ½t when the radius of curvature of RA, RB is 5t or greater. The neutral plane however moves toward the lower face side as the radius of curvature of RA, RB becomes less than 5t due to t reducing. The position of the neutral plane can generally be computed according to the following formula, wherein R denotes the radius of the neutral plane.

$$P-R=0.5t \text{ (for } R \geq 5t\text{)}, P-R=(0.25 \text{ to } 0.4)t \text{ (for } R<5t\text{)}.$$

In deformation of a flat sheet, the deformation analysis apparatus does not need to estimate the relative distance L between sensors if the change in shape computed with the sensors is taken as the deformation of the neutral plane.

Figure 19:
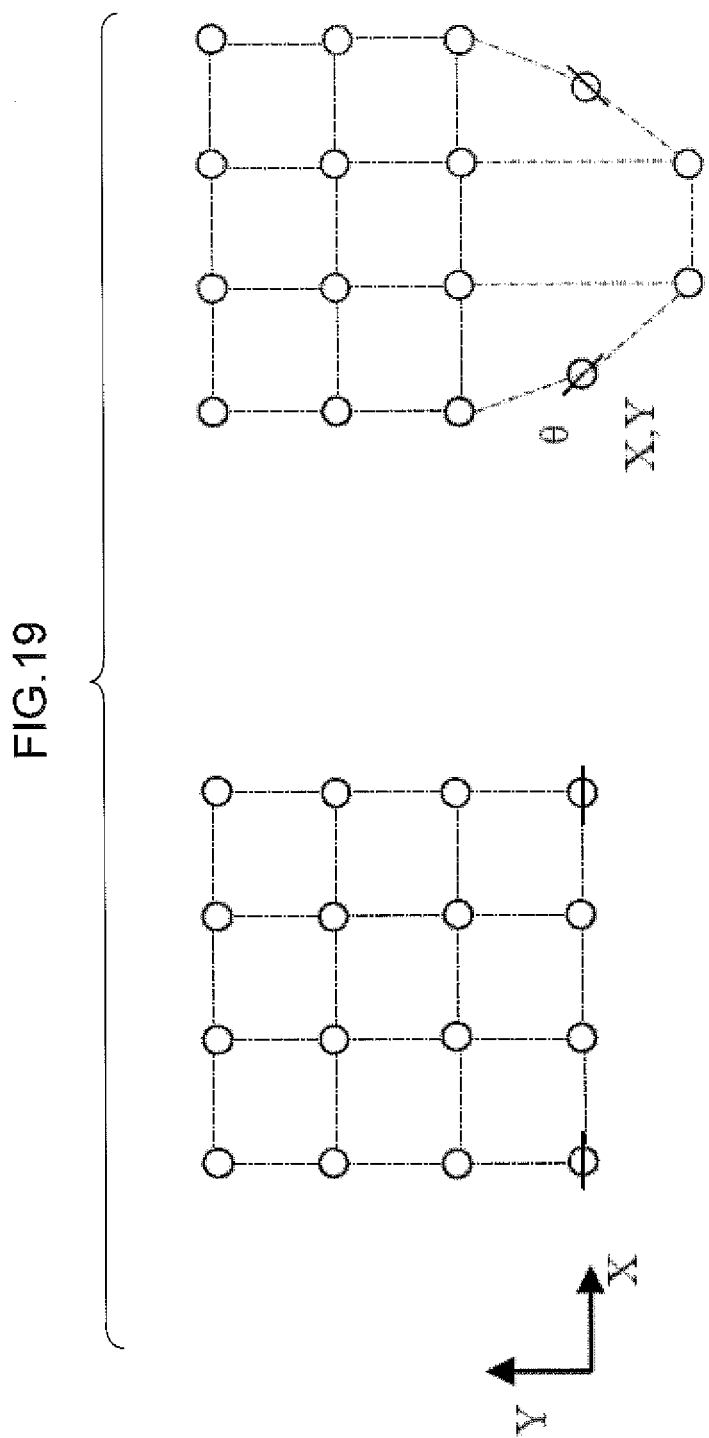
FIG. 19 is a diagram illustrating an example of a deformation mode of sensors.

The deformation analysis apparatus may also estimate the deformation state of the measurement target object using the rotation angle of a direction orthogonal to the measurement target face alongside a method to estimate the deformation amount of the measurement target object using the rotation angle θ of the measurement target object, and to estimate the relative distance L between sensors. For example, at the sensor positions illustrated in FIG. 19, the deformation analysis apparatus derives the movement distance of the 3D coordinate values of the sensors using the 3D coordinate values and the rotation angles measured for each of the sensors. The deformation analysis apparatus may then construct the overall shape by coupling together each of the sensors at the derived 3D coordinate values.

Explanation next follows regarding a deformation analysis apparatus of a fourth exemplary embodiment.

The fourth exemplary embodiment differs from the first to the third exemplary embodiments in that the measurement target object is a flat sheet body, extension occurs in the measurement face, and the attachment state of the sensors is a state in which the sensors are indirectly attached to the measurement target object. The same reference numerals are appended to configuration and operation similar to that of the deformation analysis apparatuses of the first to the third exemplary embodiments, and explanation will be omitted thereof.

Figure 20:
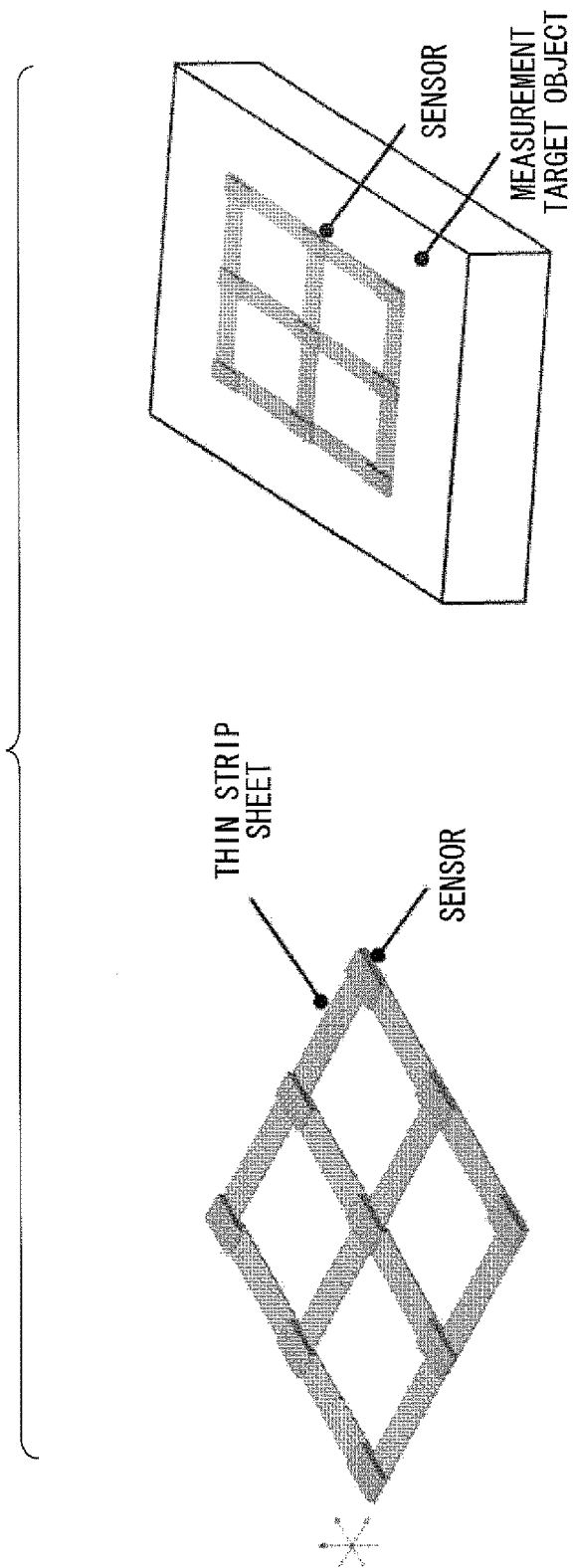
FIG. 20 is a diagram illustrating an example of sensor attachment using thin strip sheets.

Configuration of Deformation Analysis Apparatus According to Fourth Exemplary Embodiment Installation of each of the sensors to the measurement target object is by first attaching each of the sensors 10A to 10I to thin strip sheets as illustrated in FIG. 20, and then attaching each of the thin strip sheets to the measurement target object that is a flat sheet body. As an attachment method for attaching the thin strip sheets to the measurement target object, a method is employed in which part of the thin strip sheets is fixed to the measurement target object by adhesive, fixing pins, or the like.

As explained above, according to a deformation analysis apparatus 200 according to the fourth exemplary embodiment of the present invention, each of the sensors 10A to 10I are attached to the measurement target object using the thin strip sheets. The attachment face to which the thin strip sheets are attached accordingly moves relatively even when the attachment face of the measurement target object is deformed. The deformation analysis apparatus according to the fourth exemplary embodiment is accordingly able to eliminate the influence of extension of the attachment face.

The present invention is not limited to the above exemplary embodiment, and various modifications and applications are possible within a scope not departing from the spirit of the present invention.

Figure 21:
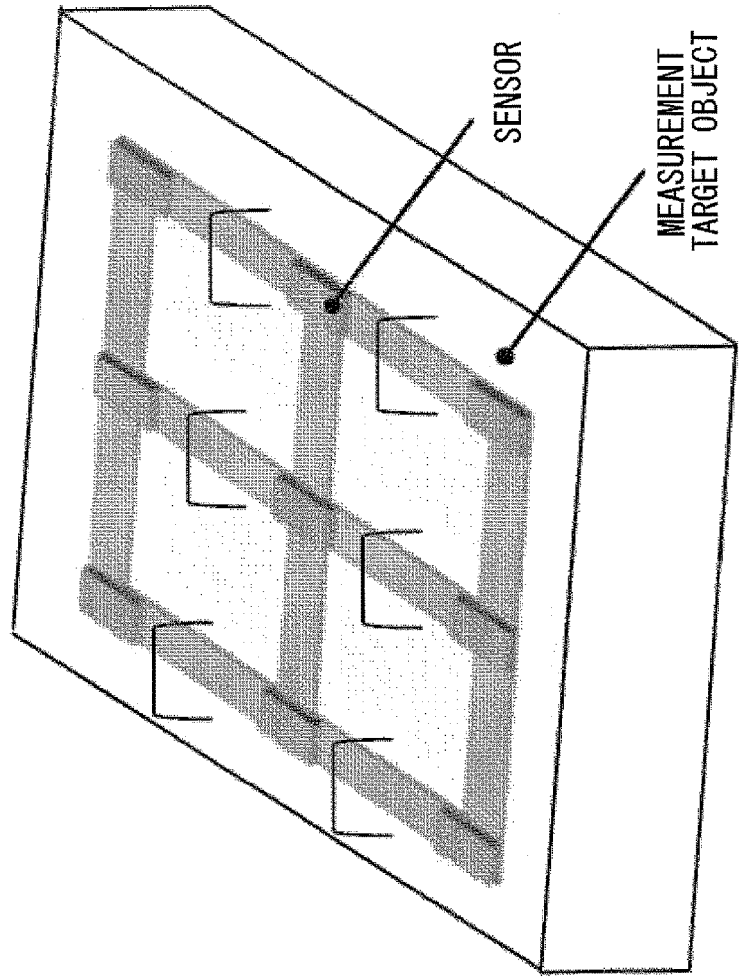
FIG. 21 is a diagram illustrating an example of a fixing method of thin strip sheets.
Figure 22:
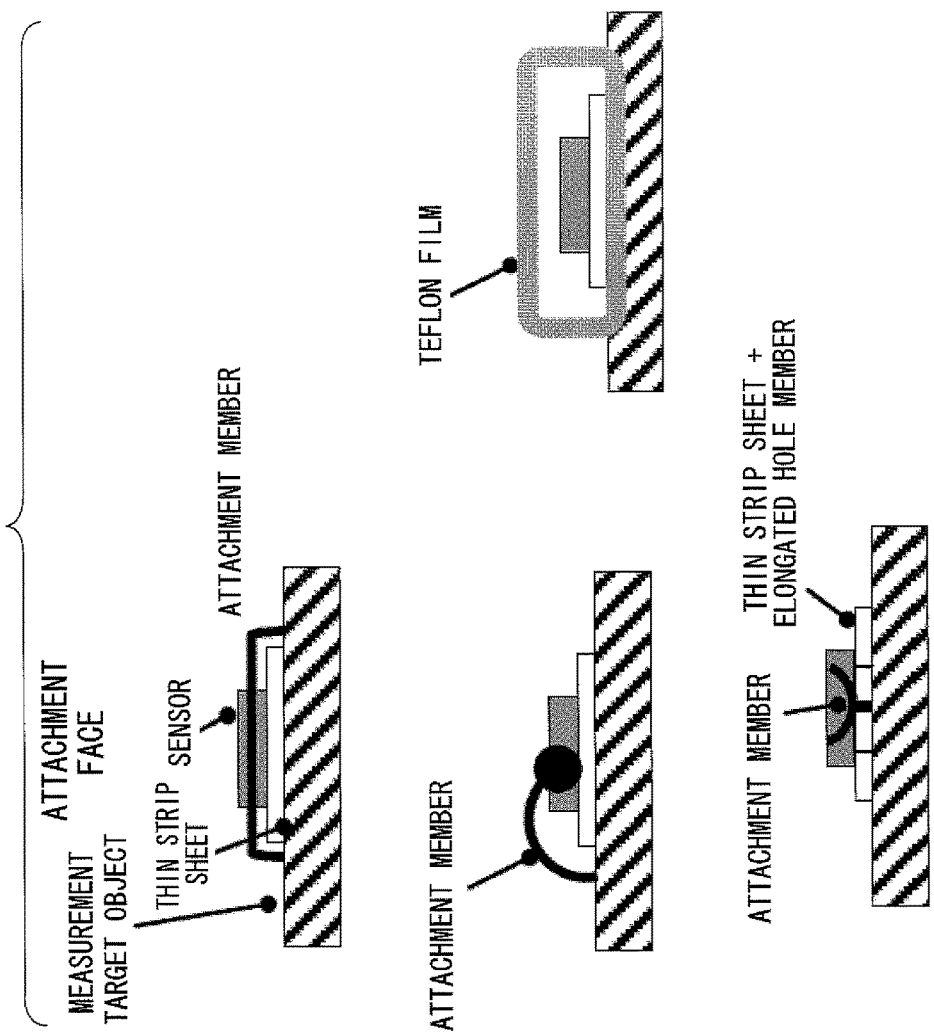
FIG. 22 is a diagram illustrating examples of attachment members.

For example, explanation has been given of a case in the fourth exemplary embodiment in which each of the sensors 10A to 10I are attached to the measurement target object using the thin strip sheets, however there is no limitation thereto. There are sometimes cases in which the thin strip sheets are not in sufficiently close contact to the attachment face of the measurement target object when the deformation mode of the measurement target object is not uniform. Thus in such cases the entire thin strip sheets may be attached so as to be movable with respect to the measurement target object. For example, as illustrated in FIG. 21, the thin strip sheets may be installed in close contact to the attachment face with members that straddle the thin strip sheets. Moreover, as a member to place the thin strip sheets in close contact, an arm shape member may be installed, or elongated holes may be opened in the thin strip sheets and pins installed, as illustrated in FIG. 22. The overall thin strip sheets may also be covered with a low friction flexible member, and the low friction flexible member fixed to the measurement face. For example, a TEFLON (registered trademark) film or similar may be employed as a low friction flexible member. A low friction flexible member enables smooth relative movement of the thin strip sheets with change in shape with deformation of the measurement target object.

Explanation next follows regarding a deformation analysis apparatus according to a fifth exemplary embodiment.

A deformation analysis apparatus according to the fifth exemplary embodiment differs from that of the first to the fourth exemplary embodiments in that the measurement target object is a solid body, extension occurs in the measurement face, and the sensor attachment state is a state of direct attachment to the measurement target object. The same reference numerals are appended to configuration and operation similar to that of the deformation analysis apparatuses of the first to the fourth exemplary embodiments, and explanation will be omitted thereof.

Configuration of Deformation Analysis Apparatus According to Fifth Exemplary Embodiment The respective sensors 10A to 10I are installed in a lattice shape on one face of the measurement target object that is a solid body. A relative distance L along the deformed shape between positions of at least two adjacently installed sensors extends and contracts according to deformation of the measurement target object.

Figure 23:
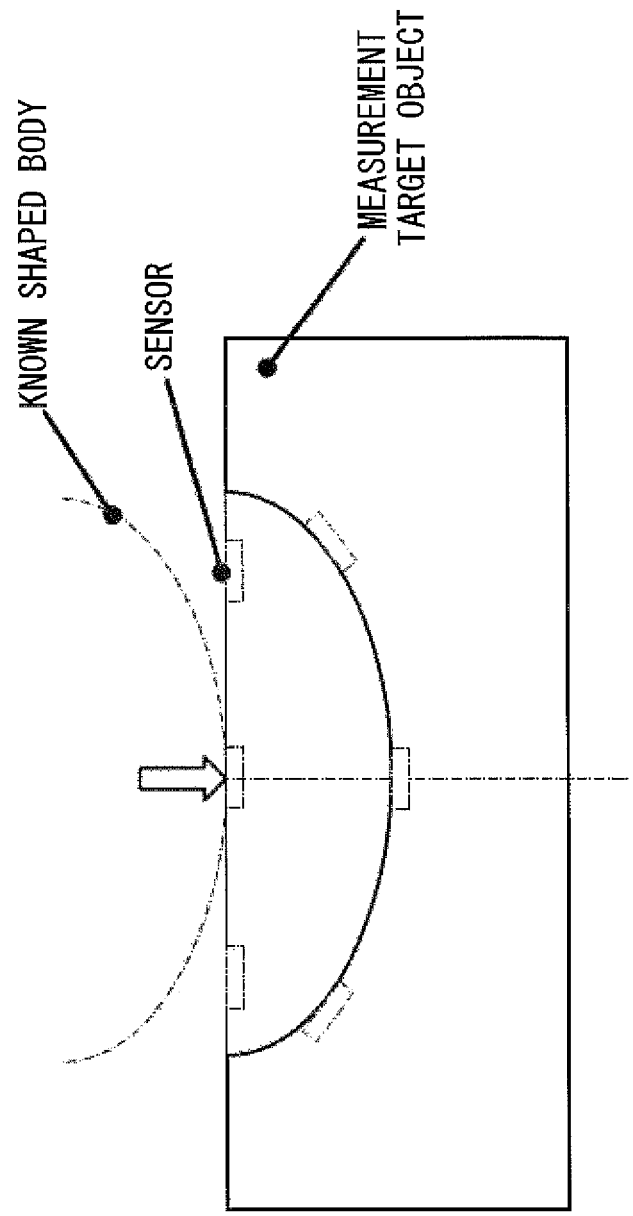
FIG. 23 is a diagram illustrating an example of correction of a solid body.

In scenarios involving local deformation of the measurement target object, a known shaped body is placed in press contact with the solid body as illustrated in FIG. 23. The distance estimation unit 323 then estimates the relative distance L between sensors based on results of shape construction from sensor signals obtained when this is performed. The distance estimation unit 323 is able to improve the estimation precision by performing shape construction using plural shapes as the known shaped body.

As explained above, the deformation analysis apparatus 200 according to the fifth exemplary embodiment of the present invention is able to estimate the relative distance L between sensors with good precision even in cases in which the measurement target object undergoes localized deformation.

The present invention is not limited to the above exemplary embodiment, and various modifications and applications are possible within a scope not departing from the spirit of the present invention.

Figure 24:
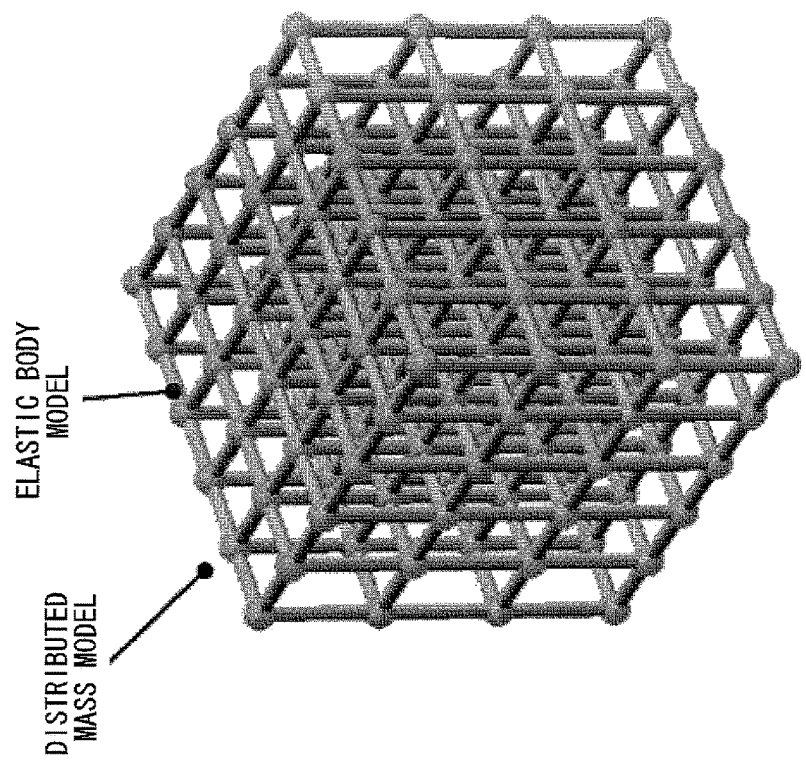
FIG. 24 is a diagram illustrating an example of a computation model of a solid body.
Figure 25:
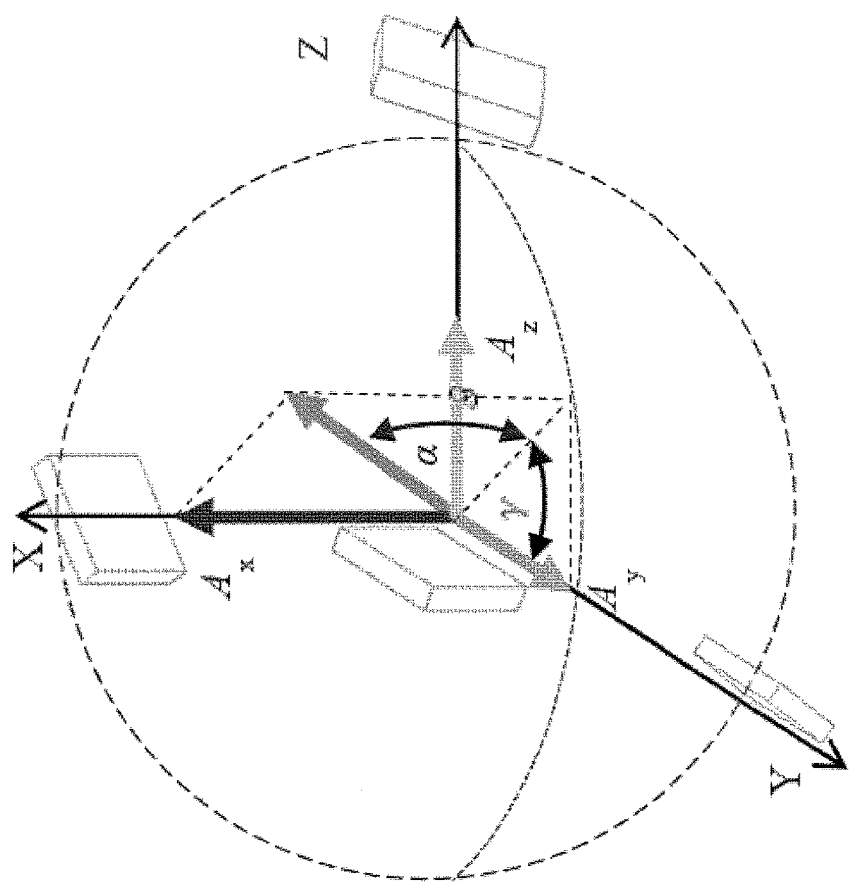
FIG. 25 is a diagram illustrating an example of computation of an initial shape using gravity.

For example, explanation has been given in the fifth exemplary embodiment of a case in which the relative distance L between sensors is estimated by the deformation analysis apparatus based on the results of shape construction from the sensor signals obtained when a known shaped body is placed in press contact with a solid body; however there is no limitation thereto. Even when the measurement target object is a solid body, in cases in which the overall shape of the measurement target object deforms, the deformation analysis apparatus may, similarly to when the measurement target object is a flat sheet body, derive contraction of the surface based on a radius of curvature R from the rotation angles to estimate the relative distance L between sensors. The deformation analysis apparatus is able to derive a deformed shape corresponding to the contraction deformation of the solid body by input of data, such as the acceleration, speed, deflection, angular velocity, and rotation angle measured by each of the sensors, into a computation model such as illustrated in FIG. 24. In the computation model, the deformation analysis apparatus needs the initial shape in order to perform shape construction. Construction of the initial shape may employ the acceleration due to gravity as illustrated in FIG. 25. The acceleration due to gravity may also be employed in a similar manner in relation to construction of the shape of the solid body after deformation. The deformation analysis apparatus is accordingly capable of evaluating the precision of a prediction result by a computation model for a shape after deformation of a solid body by comparing the result from computed construction using the computation model against a construction result using the acceleration due to gravity. If there is a difference between the two results, the deformation analysis apparatus may improve the prediction precision by correcting the computation model. The deformation analysis apparatus is also able to raise the shape prediction precision further by performing similar comparison and correction for deformation modes of various solid bodies.

Explanation follows regarding a deformation analysis apparatus according to a sixth exemplary embodiment.

The sixth exemplary embodiment differs from the first to the fifth exemplary embodiments in that the measurement target object is a solid body, extension occurs in the measurement face, and the sensor attachment state is a state of indirect attachment to the measurement target object. The same reference numerals are appended to configuration and operation similar to that of the deformation analysis apparatuses of the first to the fifth exemplary embodiments, and explanation will be omitted thereof.

Configuration of Deformation Analysis Apparatus According to Sixth Exemplary Embodiment For each of the sensors 10A to 10I, each of the sensors is attached to a thin strip sheet, and the thin strip sheets are then attached to a face of the measurement target object that is a solid body.

Figure 26:
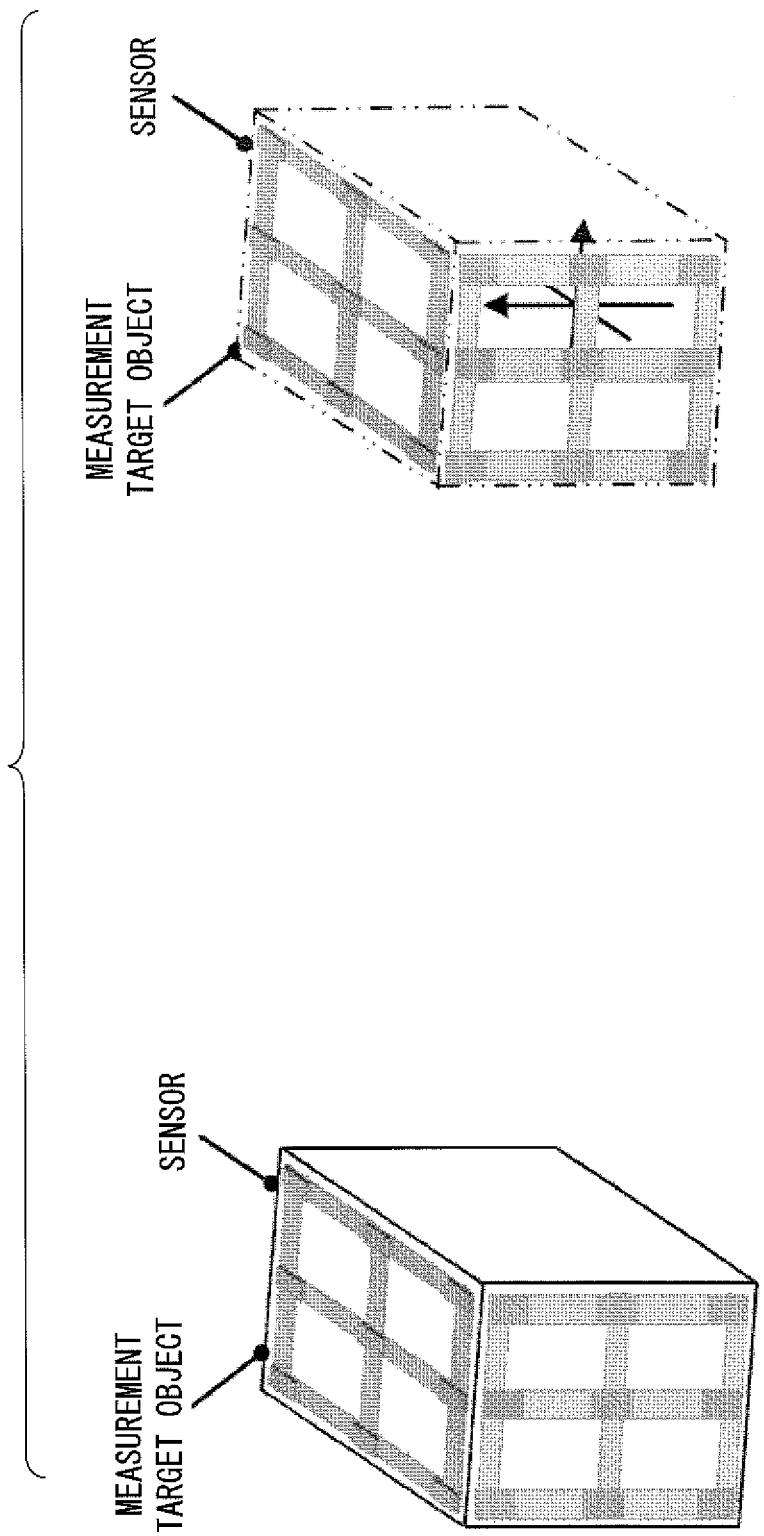
FIG. 26 is a diagram illustrating an example of attachment of thin strip sheets to a solid body.

As illustrated in the example of FIG. 26, the distance estimation unit 323 estimates the relative distance L between each of the sensors 10A to 10I on each face from the relative positions with respect to coordinates for portions where no deformation occurs, such as a center of the solid body. The relative positions of sensors at the end portions of each face can be treated as fixed since there is only a tiny positional change due to deformation between adjacent sensors on each face.

As explained above, the deformation analysis apparatus 200 according to the sixth exemplary embodiment of the present invention is able to raise the precision of the overall shape construction of the measurement target object by taking the relative positions of sensors at the end portions of each face as being fixed.

Explanation follows regarding a deformation analysis apparatus according to a seventh exemplary embodiment.

The seventh exemplary embodiment differs from the first to the sixth exemplary embodiments in the point that the measurement target object is the spinal column of a crash test dummy. The same reference numerals are appended to configuration and operation similar to that of the deformation analysis apparatuses of the first to the sixth exemplary embodiments, and explanation will be omitted thereof.

Figure 27:
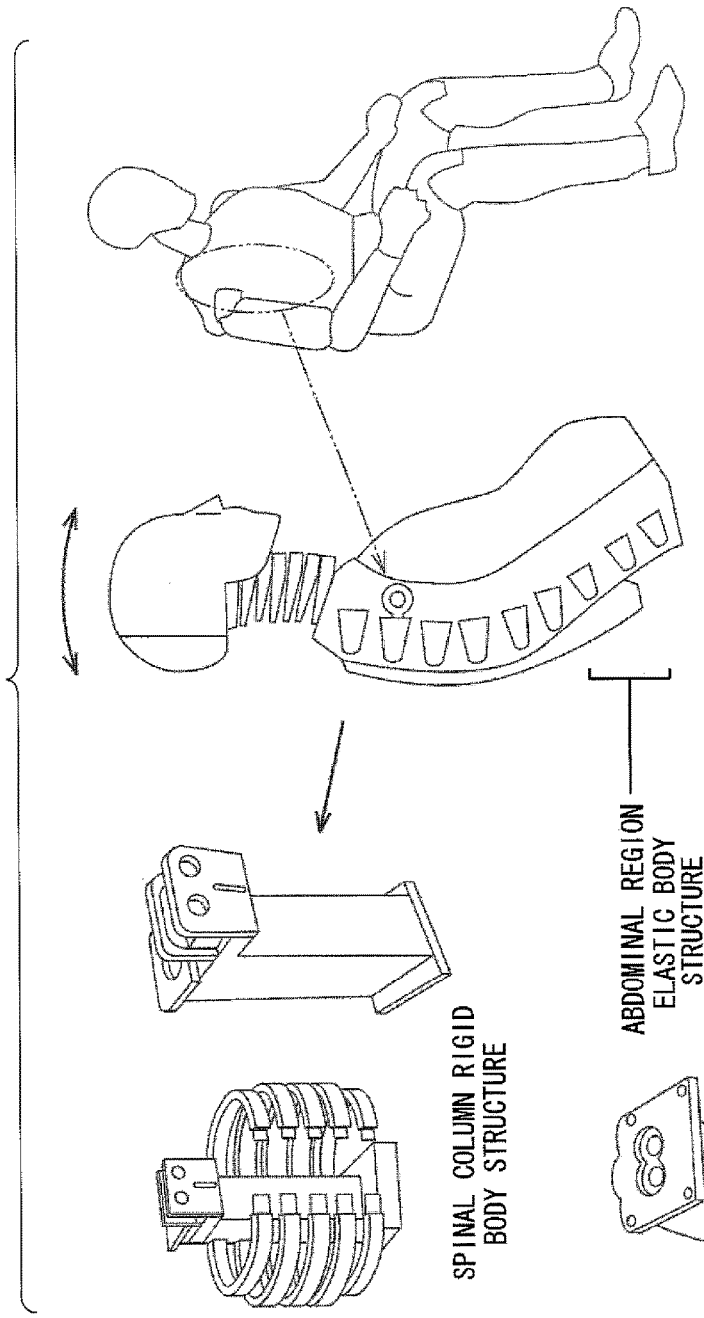
FIG. 27 is a diagram illustrating an example of an occupant dummy and a spinal column structure.
Figure 28:
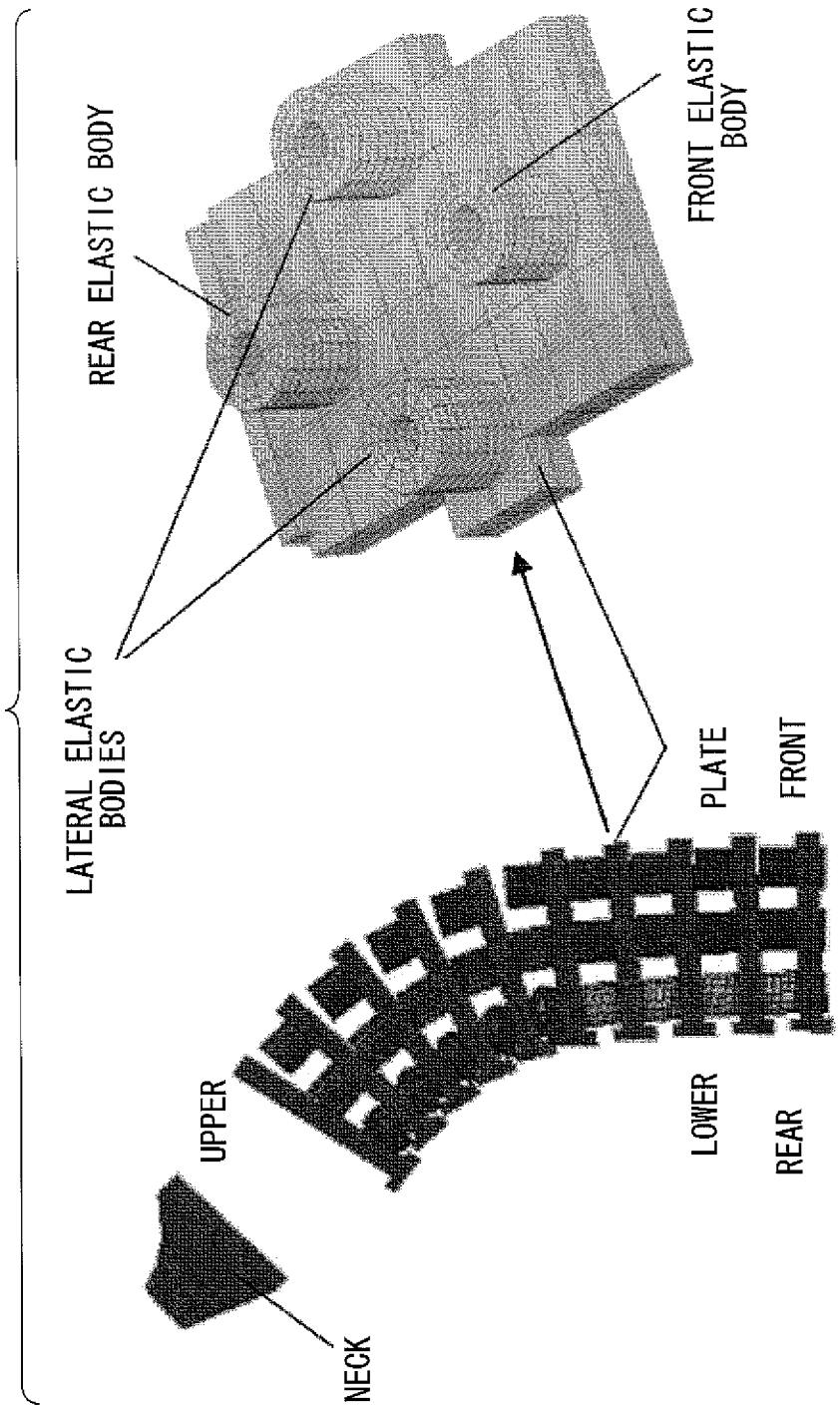
FIG. 28 is a diagram illustrating an example of a spinal column structure capable of 3D deformation.

A measurement target object of a dummy spinal column has hitherto been configured from a steel column and rubber as illustrated at the left of FIG. 27. However, in the seventh exemplary embodiment, in order to raise the similarity to a living body, the measurement target object is a dummy spinal column built from stacked blocks corresponding to vertebrae similar to those of the spinal column of a person, and is capable of deforming in the front and rear directions, as illustrated at the right in FIG. 27. Moreover, in the seventh exemplary embodiment, as illustrated in FIG. 28, the measurement target object may be a spinal column capable of deforming in three dimensions, including front-rear, and left-right, as illustrated in FIG. 28.

It is normally difficult to observe a dummy spinal column from outside due to being covered in an external skin. It is also moreover difficult to observe the external skin in the vicinity of the spinal column in an occupant dummy due to the back region being in contact with a seatback. It has hitherto been difficult to ascertain the deformation state of the spinal column during collision. This means that hitherto it has not been possible perform sufficient protection performance evaluation of protection devices such as seatbelts and airbags, or evaluation of seat characteristics.

Figure 29:
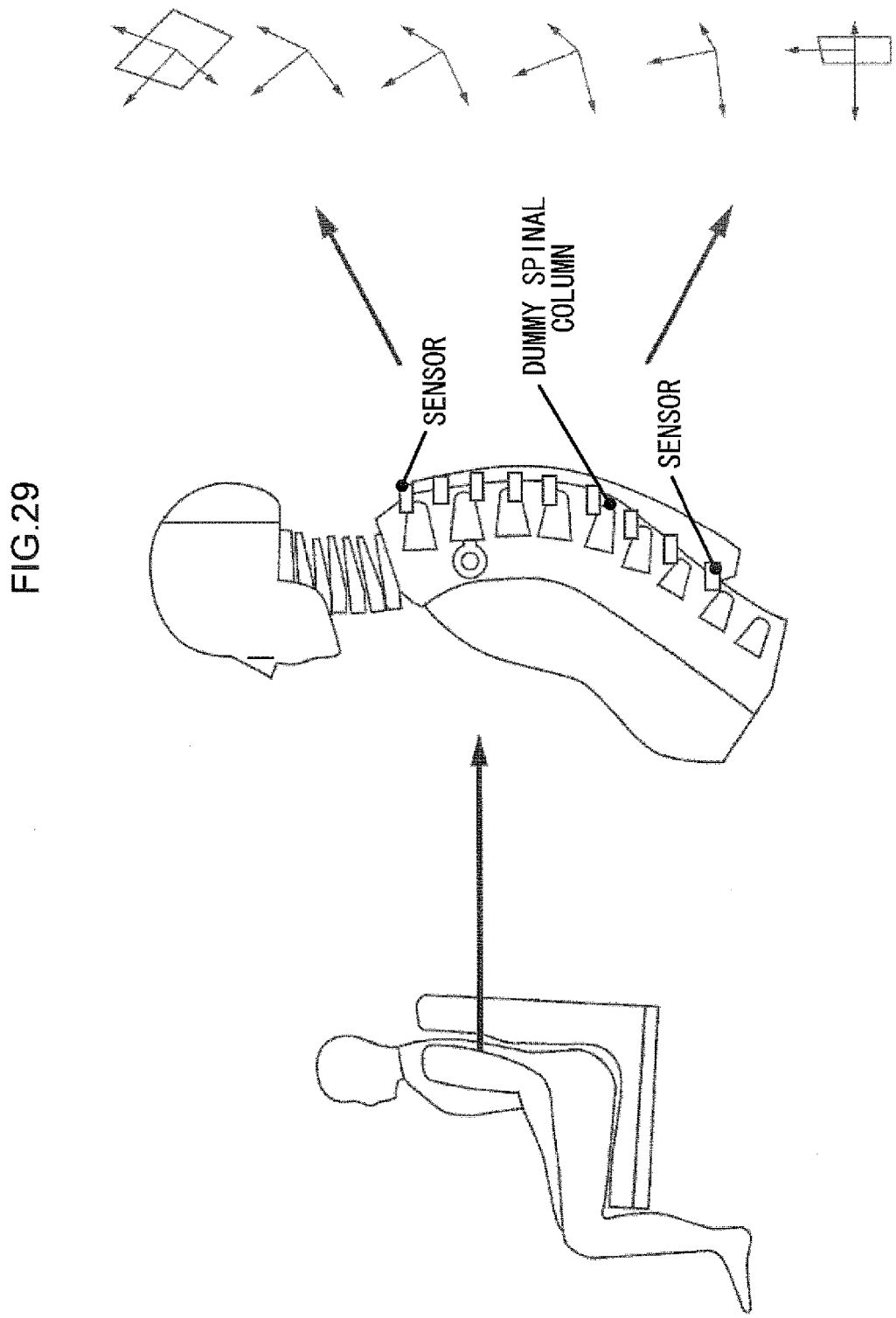
FIG. 29 is a diagram illustrating an example of a sensor incorporated into a dummy spinal column.

Configuration of Deformation Analysis Apparatus According to Seventh Exemplary Embodiment Sensors 10 are installed at blocks of a dummy spinal column as illustrated in FIG. 29. The number of the sensors 10 is the same as the number of the blocks in the dummy spinal column. Joints couple between each of the blocks, and the relative distance between the blocks is fixed.

As explained above, the deformation analysis apparatus 200 according to the seventh exemplary embodiment of the present invention is able to obtain 3D coordinate values of each of the blocks by installing each of the sensors to each of the blocks of the dummy spinal column. The deformation analysis apparatus also measures the rotation angles about the three axes in the block coordinate system. The deformation analysis apparatus is accordingly capable of obtaining a history of deformation with time of the spinal column.

The deformed shape computation method of the seventh exemplary embodiment is similar to in the first and second exemplary embodiments, and time series data is obtained for 3D coordinate values as illustrated in FIG. 29. Such data was hitherto difficult to obtain, but is obtainable by employing the deformation analysis apparatus according to the seventh exemplary embodiment. The deformation analysis apparatus is accordingly capable of performing high precision protection performance evaluation of protection devices such as seatbelts and airbags, or high precision evaluation of seat characteristics.

Explanation next follows regarding a deformation analysis apparatus according to an eighth exemplary embodiment.

The eighth exemplary embodiment differs from the first to the seventh exemplary embodiments in that the measurement target object is an elastic solid body. The same reference numerals are appended to configuration and operation similar to that of the deformation analysis apparatuses of the first to the seventh exemplary embodiments, and explanation will be omitted thereof.

Configuration of Deformation Analysis Apparatus According to Eighth Exemplary Embodiment Sensors 10A to 10H are installed at the 8 vertices of the measurement target object that is an elastic solid body. Such elastic solid bodies encompass the abdominal region and the like of a crash test dummy.

Figure 30:
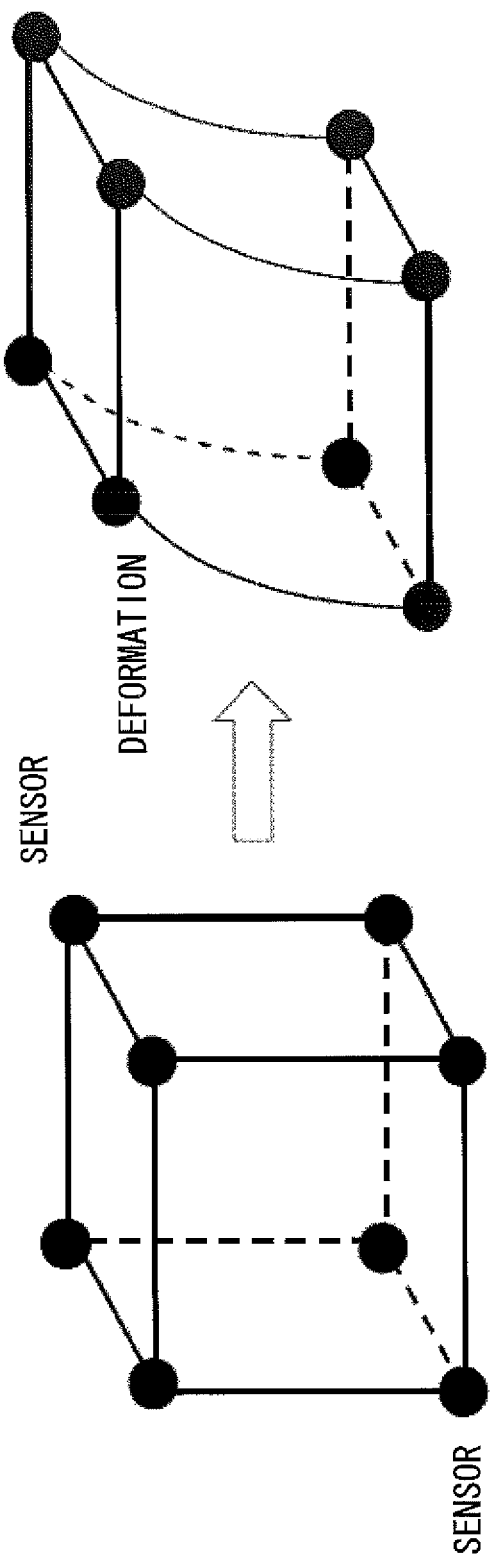
FIG. 30 is a diagram illustrating an example of attachment of sensors to an elastic body of a 3D solid body.

As explained above, in the deformation analysis apparatus 200 according to the eighth exemplary embodiment of the present invention, the respective sensors are installed at each of the 8 vertices of the measurement target object that is the elastic solid body. Thereby the deformation analysis apparatus is capable of deriving the deformation state of the measurement target object of the elastic solid body as illustrated in FIG. 30, from the 3D coordinate values of the vertices. The deformation analysis apparatus is thereby capable of obtaining deformation history of the elastic solid body. The deformation analysis apparatus is also capable of deriving the volumetric change in the solid body and strain within the solid body. The deformation analysis apparatus performs computation processing by a processing method similar to processing in finite element analysis using solid elements.

The present invention is not limited to the above exemplary embodiment, and various modifications and applications are possible within a scope not departing from the spirit of the present invention.

Figure 31A:
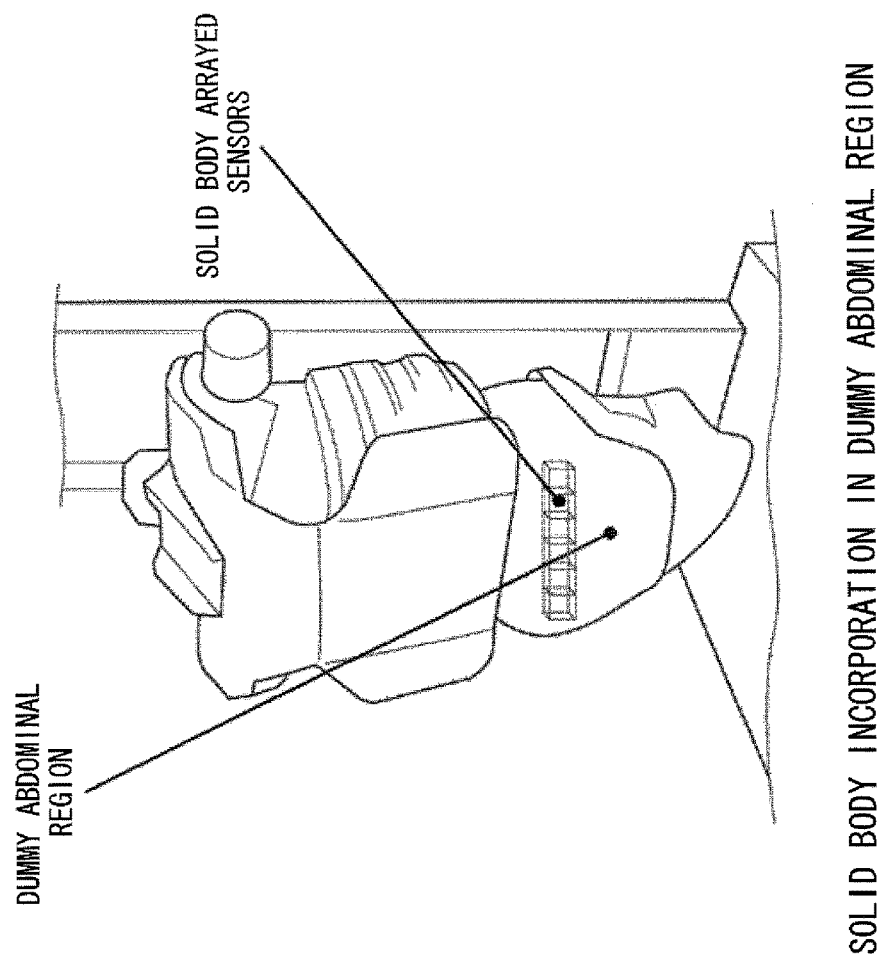
FIG. 31A is a diagram illustrating an example of incorporation of sensors into a solid body.
Figure 31B:
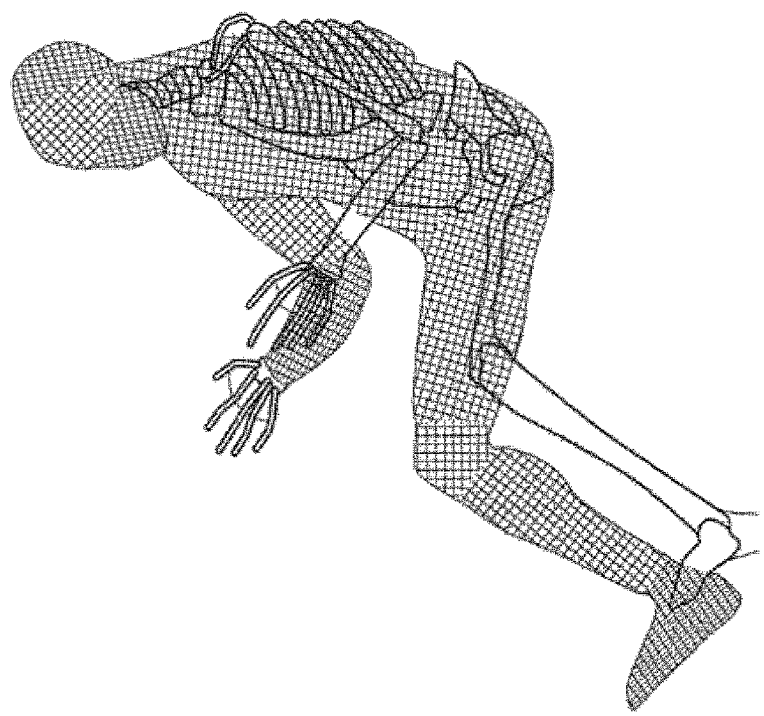
FIG. 31B is a diagram illustrating an example of incorporation of sensors into a solid body.

For example, explanation has been given of a case in the eighth exemplary embodiment in which the measurement target object is a single solid body, however there is no limitation thereto. The measurement target object may have a complicated shape of the abdominal region of a crash test dummy, formed by a combination of single solid bodies, as illustrated in FIG. 31A. Such a configuration is analogous to a mesh configuration of a finite element analysis model of the human body illustrated in FIG. 31B, and deformation analysis data obtained also enables analogous data to be obtained for deformation and strain.

Explanation next follows regarding a deformation analysis apparatus according to a ninth exemplary embodiment.

Figure 32:
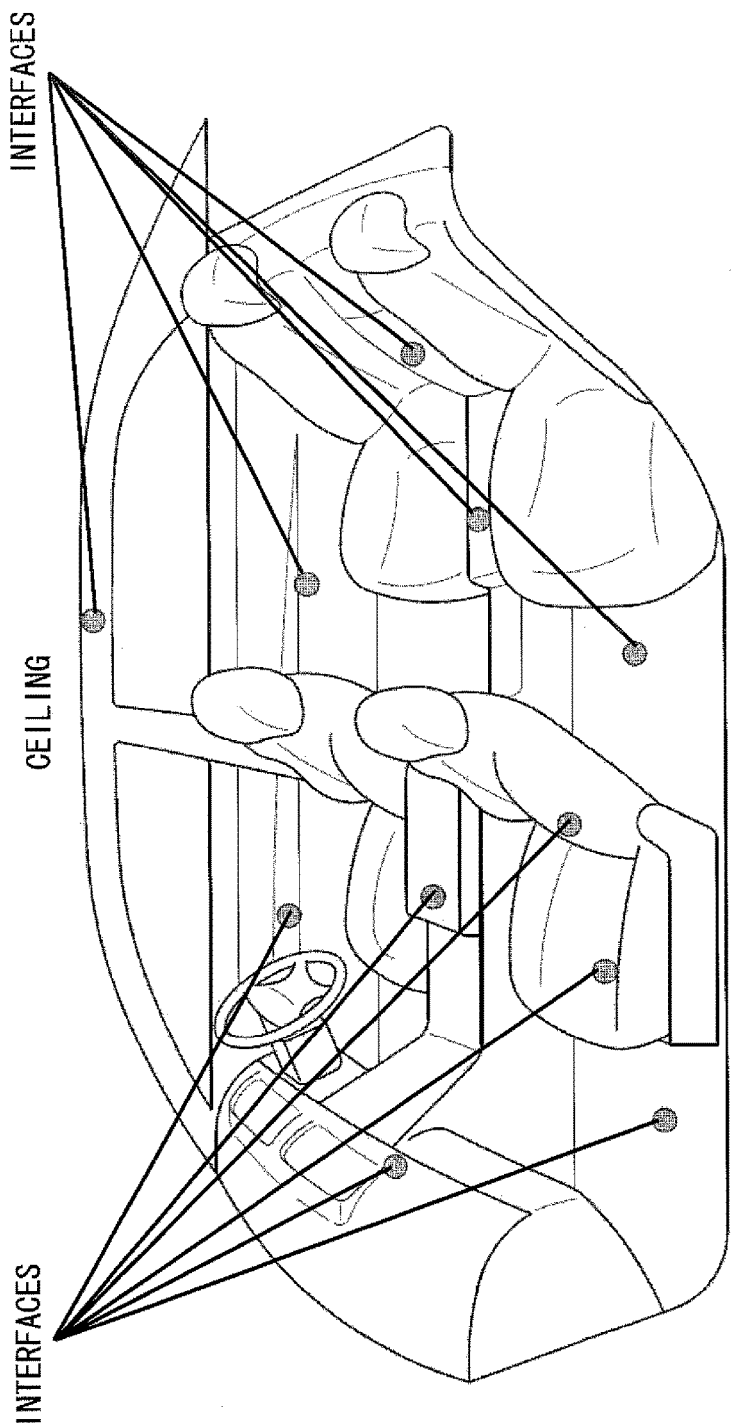
FIG. 32 is a diagram illustrating an example of installation of human interfaces.

The ninth exemplary embodiment differs from the first to the eighth exemplary embodiment in that the deformation analysis apparatus is employed as a human interface, as illustrated in FIG. 32, and the deformation analysis apparatus is installed in an armrest. The same reference numerals are appended to configuration and operation similar to that of the deformation analysis apparatuses of the first to the seventh exemplary embodiments, and explanation will be omitted thereof.

The deformation analysis apparatus 200 is installed at an armrest as illustrated in FIG. 33A. The deformation analysis apparatus 200 outputs a state change amount of the deformation of the measurement target object that is an armrest from an output unit 90 to a controller (not illustrated in the drawings) that controls a vehicle.

Figure 33B:
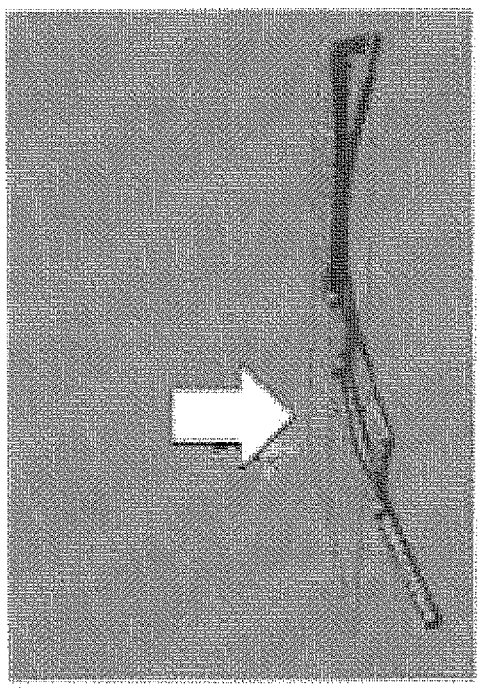
FIG. 33B is a diagram illustrating an example of a human interface installed in an armrest.
Figure 33C:
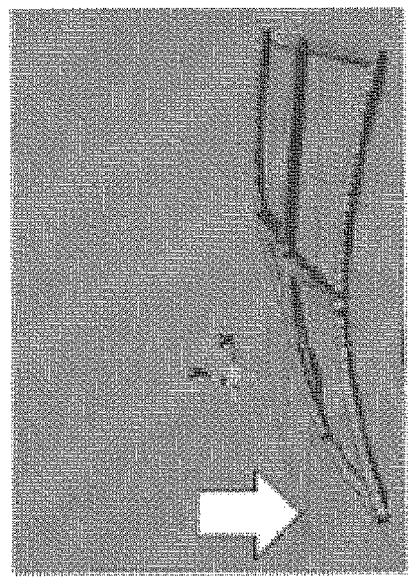
FIG. 33C is a diagram illustrating an example of a human interface installed in an armrest.
Figure 33D:
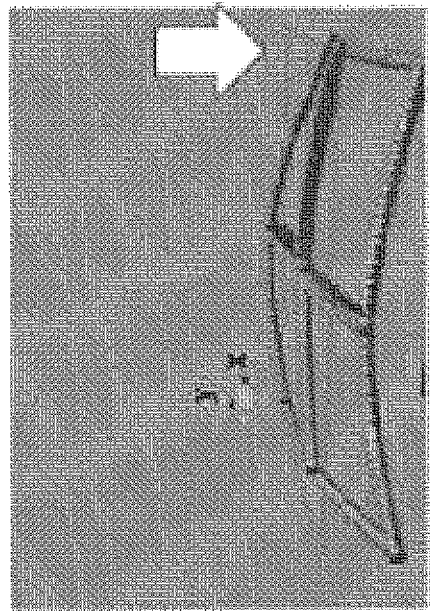
FIG. 33D is a diagram illustrating an example of a human interface installed in an armrest.

The controller performs vehicle control based on the state change amount input from the deformation analysis apparatus 200. Specifically, as illustrated in the examples of FIG. 33B, FIG. 33C, FIG. 33D, and FIG. 33E, the controller performs 4 types of control according to the state change amount, namely air conditioner control as illustrated in FIG. 33B, power window control as illustrated in FIG. 33C, audio control as illustrated in FIG. 33D, and lighting control as illustrated in FIG. 33E. For example, the controller adopts the air conditioner control mode as illustrated in FIG. 33B on deformation at the near right, and performs temperature setting according to the deformation amount. The controller adopts the power window control mode as illustrated in FIG. 33C on deformation at the near left, and by switching control mode the controller controls opening and closing, and the open and close amounts, of the four windows on the left and right at the front and back. The controller adopts the audio control mode as illustrated in FIG. 33D on deformation at the far right, and by switching control mode the controller controls the volume, the track and the like of a reproduction device, such as a radio or DVD player. The controller adopts the lighting control mode illustrated in FIG. 33E on deformation at the far left, and controls the illumination of the lights in the vehicle cabin.

As explained above, the deformation analysis apparatus 200 according to the ninth exemplary embodiment of the present invention is capable of performing many functions by being employed as a single human interface. The deformation analysis apparatus according to the ninth exemplary embodiment of the present invention is also capable of raising the degrees of freedom for placement, degrees of freedom for interface shape, and the like.

The deformation analysis apparatus 200 may be employed with sensors in an attached state to thin strip sheets. The deformation analysis apparatus accordingly does not need a special attachment support member, and is able to implement the excellent characteristic of being able to achieve high degrees of freedom for attachment position and lighter vehicle weight in comparison to other interfaces.

The deformation analysis apparatus is also capable of being employed as a substitute for the function of many switches due to being able to assign processing according to deformation amount and deformation mode.

The present invention is not limited to the above exemplary embodiment, and various modifications and applications are possible within a scope not departing from the spirit of the present invention.

For example, explanation has been given in the ninth exemplary embodiment of a case in which the deformation analysis apparatus is installed in an armrest; however there is no limitation thereto. The deformation analysis apparatus may be attached to a deformable position on an instrument panel, seat, or door side face. The deformation analysis apparatus thereby may be employed as a human interface to perform processing according to the intentions of an occupant.

Explanation next follows regarding a deformation analysis apparatus according to a tenth exemplary embodiment.

The tenth exemplary embodiment differs from the first to the ninth exemplary embodiments in that the deformation analysis apparatus is incorporated into a seat cushion and seatback. The same reference numerals are appended to configuration and operation similar to that of the deformation analysis apparatuses of the first to the ninth exemplary embodiments, and explanation will be omitted thereof.

The deformation analysis apparatus 200 is installed incorporated into a seat cushion (not illustrated in the drawings) and a seatback (not illustrated in the drawings) of a vehicle. The deformation analysis apparatus 200 outputs a state change amount of the measurement target object that is the seat cushion and the seatback from an output unit 90 to a controller (not illustrated in the drawings) that controls a vehicle.

The controller adjusts the air conditioning based on the state change amount of the measurement target object input from the deformation analysis apparatus 200.

As explained above, the deformation analysis apparatus 200 according to the tenth exemplary embodiment of the present invention evaluates the ride comfort of an occupant during travel based on the state change amount of the seat cushion and seatback. Moreover, improved comfort can be achieved by the controller adjusting the air conditioning based on the evaluation results of the deformation analysis apparatus.

Explanation follows regarding a deformation analysis apparatus according to an eleventh exemplary embodiment.

The eleventh exemplary embodiment differs from the first to the tenth exemplary embodiments in that the deformation analysis apparatus is installed in a bumper or the like, as illustrated in FIG. 34. The same reference numerals are appended to configuration and operation similar to that of the deformation analysis apparatuses of the first to the tenth exemplary embodiments, and explanation will be omitted thereof.

The deformation analysis apparatus 200 is installed incorporated into a bumper portion of a vehicle as illustrated in FIG. 34. The deformation analysis apparatus 200 outputs a state change amount of the measurement target object that is the bumper to a controller (not illustrated in the drawings) that controls a vehicle from an output unit 90.

The controller controls protection equipment based on the state change amount of the measurement target object input from the deformation analysis apparatus 200.

As explained above, the deformation analysis apparatus 200 according to the eleventh exemplary embodiment of the present invention acquires the shape of a body that has been involved in a collision based on the state change amount of the bumper. The deformation analysis apparatus discriminates the collision object based on the acquired shape of the body that has collided. Based on the discrimination result by the deformation analysis apparatus, the controller is able to raise controllability of protection equipment by controlling the protection equipment.

Explanation next follows regarding a deformation analysis apparatus of a twelfth exemplary embodiment.

The twelfth exemplary embodiment differs from the first to the eleventh exemplary embodiments in that the deformation analysis apparatus is installed at a vehicle body. The same reference numerals are appended to configuration and operation similar to that of the deformation analysis apparatuses of the first to the eleventh exemplary embodiments, and explanation will be omitted thereof.

Figure 35:
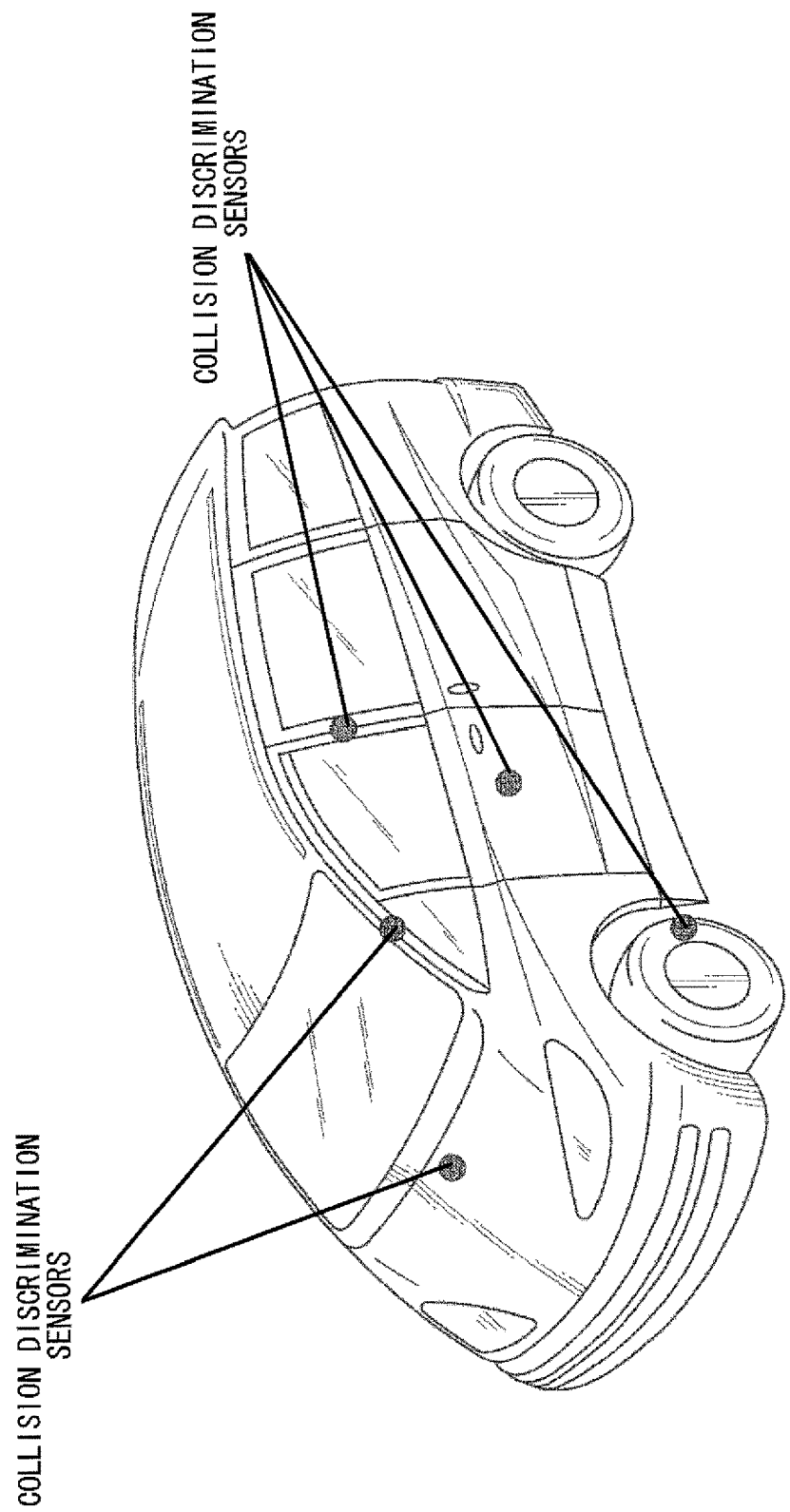
FIG. 35 is a diagram illustrating an example of utilization as vehicle body sensors.

The deformation analysis apparatus 200 is installed at a vehicle body as a collision discrimination sensor, as illustrated in FIG. 35. The deformation analysis apparatus 200 outputs a state change amount of the measurement target object that is the vehicle body to a controller (not illustrated in the drawings) that controls a vehicle.

The controller controls the vehicle based on the state change amount input from the deformation analysis apparatus 200. Specifically, the controller controls the deployment state of a collision airbag according to the deformation state of a door based on the state change amount from the deformation analysis apparatus 200 installed in a door side face. The controller performs deployment control of an airbag employed for pedestrians and cyclists based on the state change amount from the deformation analysis apparatus 200 installed in a hood or pillar.

As explained above, in the twelfth exemplary embodiment of the present invention, the controller is capable of deployment control of an airbag based on a state change amount of a vehicle output by the deformation analysis apparatus 200.

Explanation next follows regarding a deformation analysis apparatus of a thirteenth exemplary embodiment.

The thirteenth exemplary embodiment differs from the first to the twelfth exemplary embodiments in that the deformation analysis apparatus is installed at a tire. The same reference numerals are appended to configuration and operation similar to that of the deformation analysis apparatuses of the first to the twelfth exemplary embodiments, and explanation will be omitted thereof.

The deformation analysis apparatus 200 is installed incorporated into a tire. The deformation analysis apparatus 200 outputs a state change amount of the measurement target object that is the tire to a controller (not illustrated in the drawings) that controls a vehicle.

As explained above, in the thirteenth exemplary embodiment of the present invention, the controller is able to perform running control of a vehicle and tire state monitoring based on the state change amount of the tire output by the deformation analysis apparatus 200.

The present invention is not limited to the above exemplary embodiment, and various modifications and applications are possible within a scope not departing from the spirit of the present invention.

For example, explanation has been given of a case in the thirteenth exemplary embodiment in which the deformation analysis apparatus 200 is installed by incorporating into a tire, however there is no limitation thereto. The deformation analysis apparatus 200 may be installed at another portion of the vehicle other than the tire.

Explanation next follows regarding a deformation analysis apparatus according to a fourteenth exemplary embodiment.

The fourteenth exemplary embodiment differs from the first to the thirteenth exemplary embodiments in that the deformation analysis apparatus is incorporated into an airbag. The same reference numerals are appended to configuration and operation similar to that of the deformation analysis apparatuses of the first to the thirteenth exemplary embodiments, and explanation will be omitted thereof.

Figure 36A:
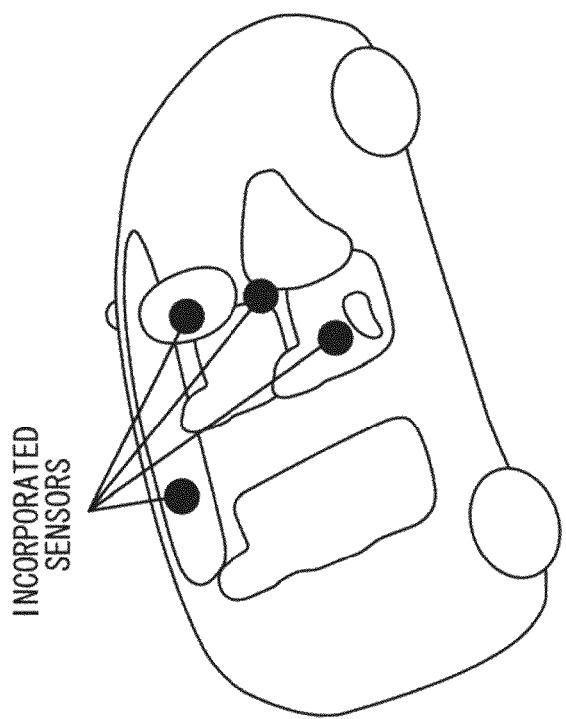
FIG. 36A is a diagram illustrating an example of utilization in occupant protection devices.

The deformation analysis apparatus 200 is installed by incorporating into an airbag that performs occupant protection, as illustrated in FIG. 36A. The deformation analysis apparatus 200 outputs a state change amount of the measurement target object that is the airbag to a controller (not illustrated in the drawings) that controls a vehicle.

The controller controls the deployment state of the airbag and controls airbag pressure based on the state change amount of the measurement target object input from the deformation analysis apparatus 200.

As explained above, in the fourteenth exemplary embodiment of the present invention, the controller controls the deployment state of the airbag and controls airbag pressure based on the state change amount of the airbag output by the deformation analysis apparatus 200. The deformation analysis apparatus is thereby capable of realizing higher safety.

By employing the deformation analysis apparatus in airbag protection, the controller is able to control the deployment state of the airbag while determining the contact state between an occupant and the airbag. Namely, the controller is able to perform airbag deployment control, hitherto been performed by pressure, by control based on the airbag shape during contact with an occupant. The controller accordingly is able to control the airbag pressure so as to obtain the optimum attenuation amount from the contact surface area between the occupant and the airbag and the deformation amount.

Explanation next follows regarding a deformation analysis apparatus according to a fifteenth exemplary embodiment.

The fifteenth exemplary embodiment differs from the first to the fourteenth exemplary embodiments in that the deformation analysis apparatus is incorporated into a seatbelt. The same reference numerals are appended to configuration and operation similar to that of the deformation analysis apparatuses of the first to the fourteenth exemplary embodiments, and explanation will be omitted thereof.

Figure 36B:
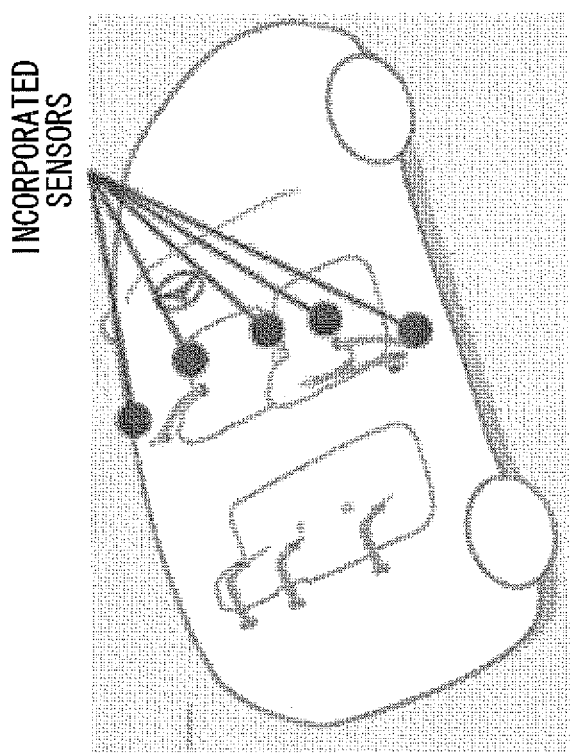
FIG. 36B is a diagram illustrating an example of utilization in occupant protection devices.

The deformation analysis apparatus 200 is installed by incorporating into a seatbelt for protecting an occupant, as illustrated in FIG. 36B. The deformation analysis apparatus 200 outputs a state change amount of a measurement target object that is the seatbelt to a controller (not illustrated in the drawings) that controls a vehicle.

The controller performs control of the seatbelt based on the state change amount of the measurement target object input from the deformation analysis apparatus.

As explained above, in the fifteenth exemplary embodiment of the present invention, the controller controls the seatbelt based on the state change amount of the seatbelt output by the deformation analysis apparatus 200. The controller is thereby able to estimate the deformation state of a person's chest region and abdominal region contacted by the seatbelt, and adjust the protection performance of the seatbelt appropriately.

Explanation next follows regarding a deformation analysis apparatus according to a sixteenth exemplary embodiment.

Figure 37A:
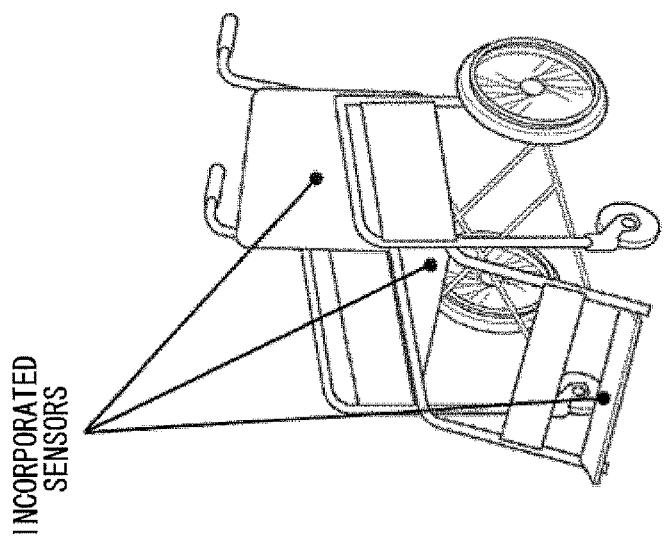
FIG. 37A is a diagram illustrating an example of utilization in nursing equipment.

The sixteenth exemplary embodiment differs from the first to the fifteenth exemplary embodiments in that the deformation analysis apparatus is employed as a sensor for the seating state on a wheelchair as illustrated in FIG. 37A. The same reference numerals are appended to configuration and operation similar to that of the deformation analysis apparatuses of the first to the fifteenth exemplary embodiments, and explanation will be omitted thereof.

The seated state on a wheelchair is important for ensuring safety during travel and to raise the comfort of a user. The wheelchair is manufactured such that the seat is able to readily deform due to demands for ease of movement. As a sensor that ascertains the seated state during use, there is accordingly a need for the ability to measure 3D deformation while combining both easy deformation with compactness. However, suitable sensors have hitherto not been available.

The deformation analysis apparatus 200 is installed by incorporating into the wheelchair, as illustrated in FIG. 37A. The deformation analysis apparatus 200 acquires the state change amount of the measurement target object that is the wheelchair.

As explained above, in the sixteenth exemplary embodiment of the present invention, the seated state during use of the wheelchair can be ascertained based on the state change amount of the wheelchair output by the deformation analysis apparatus 200.

The deformation analysis apparatus 200 also enables control as a human interface according to the intentions of a user.

Explanation next follows regarding a deformation analysis apparatus according to a seventeenth exemplary embodiment.

The seventeenth exemplary embodiment differs from the first to the sixteenth exemplary embodiments in that the deformation analysis apparatus is employed as a sensor for a bed deformation state as illustrated in FIG. 37B. The same reference numerals are appended to configuration and operation similar to that of the deformation analysis apparatuses of the first to the sixteenth exemplary embodiments, and explanation will be omitted thereof.

There is an issue with medical beds and the like of injury resulting from pressure on the body due to prolonged periods in bed. Pressure sensors are accordingly employed to ascertain the body pressure state. However, it is difficult to ascertain the bed deformation when pressed by a body using pressure sensors. This is due to measurement results of pressure sensors not sufficiently corresponding to bed deformation.

The deformation analysis apparatus 200 is installed by incorporating into a bed, as illustrated in FIG. 37B. The deformation analysis apparatus 200 acquires the state change amount of the measurement target object that is the bed.

As explained above, the seventeenth exemplary embodiment of the present invention is able to measure bed deformation using the deformation analysis apparatus 200. The deformation analysis apparatus is accordingly applicable to addressing the issue referred to of injury resulting from pressure on the body. The deformation analysis apparatus is capable of being employed as a human interface to control according to the intentions of a user.

Explanation next follows regarding a deformation analysis apparatus according to an eighteenth exemplary embodiment.

The eighteenth exemplary embodiment differs from the first to the seventeenth exemplary embodiments in that the deformation analysis apparatus is applied in medical treatment. The same reference numerals are appended to configuration and operation similar to that of the deformation analysis apparatuses of the first to the seventeenth exemplary embodiments, and explanation will be omitted thereof.

Figure 38:
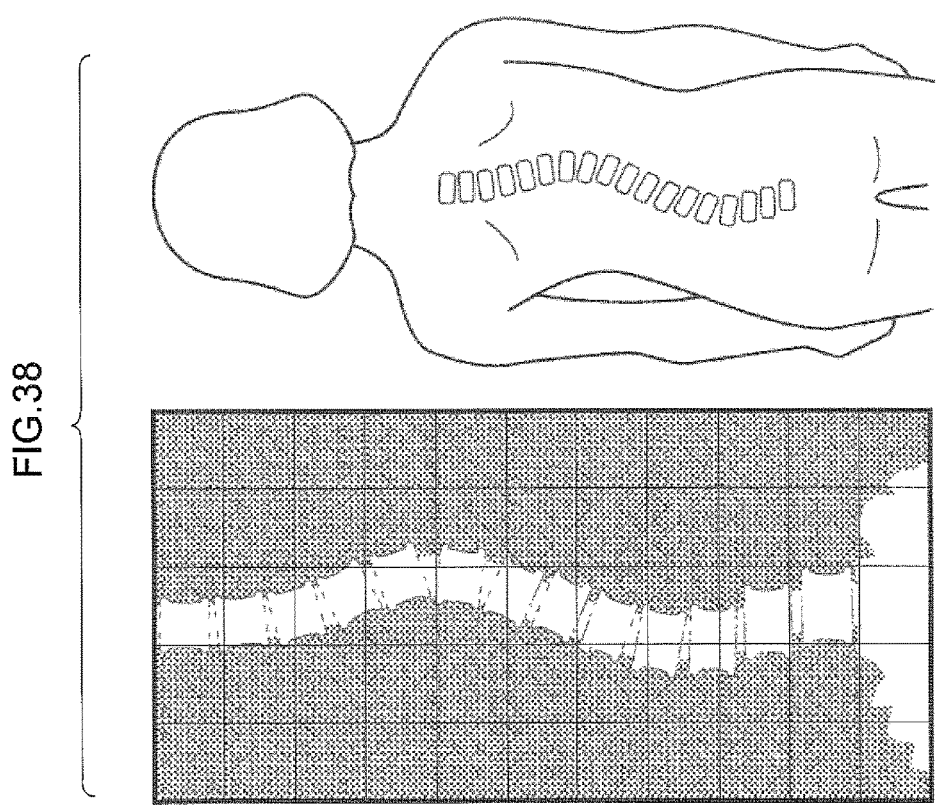
FIG. 38 is a diagram illustrating an example of utilization in the field of medical treatment.
Figure 39A:
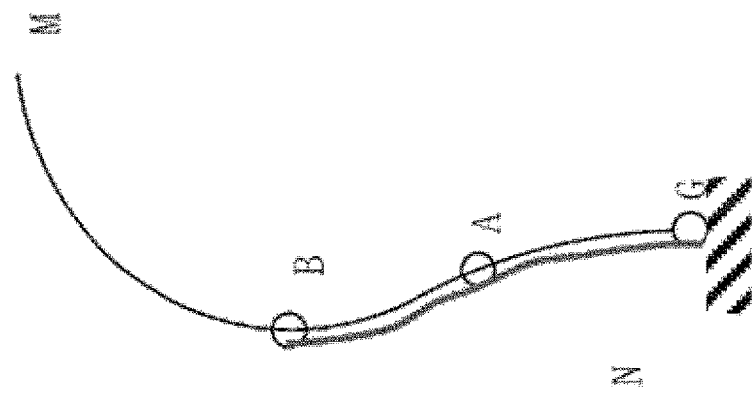
FIG. 39A is a diagram illustrating an example of effects of extension characteristics of a measurement target object on measurement results.
Figure 39B:
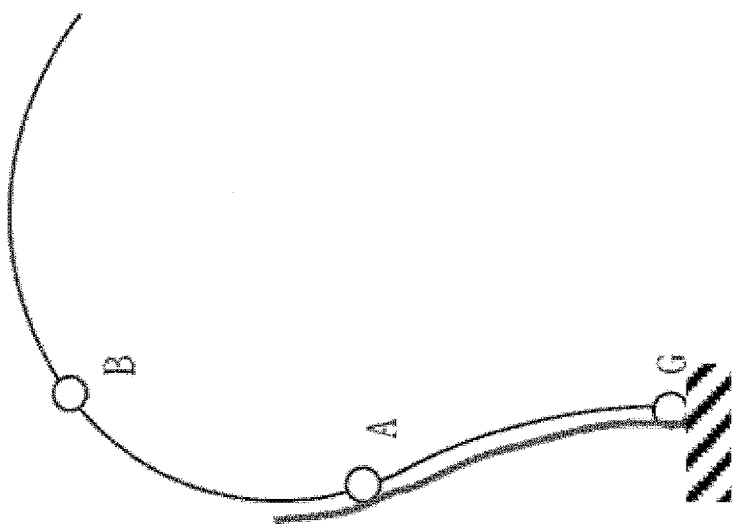
FIG. 39B is a diagram illustrating an example of effects of extension characteristics of a measurement target object on measurement results.

In the human body there sometimes a disorder arises from spinal deformation due to scoliosis, kyphosis, or the like, as illustrated in FIG. 38. Diagnosis has hitherto been performed by imaging, such as by X-rays or MRI, however it has been difficult to sufficiently ascertain the state due to the difficulty of measuring during motion. There is accordingly an issue that it has been difficult to quantitatively ascertain the recovery state from symptoms.

Each of the sensors 10 are attached to the skin surface at the spine of a person.

As explained above, the deformation analysis apparatus 200 according to the eighteenth exemplary embodiment of the present invention is capable of ascertaining the deformation state during various motions due to the sensors being attached to the skin surface at the spine. The deformation analysis apparatus accordingly obtains the excellent effect of being able to provide useful data for performing medical treatment. The deformation analysis apparatus also exhibits the excellent effect of being able to quantitatively evaluate the state of functional recovery due to being able to save 3D deformation amounts as numerical data.

The present invention is not limited to the above exemplary embodiments, and various modifications and applications are possible within a scope not departing from the spirit of the present invention.

For example, explanation has been given of a case in the fourth exemplary embodiment to the eighteenth exemplary embodiment in which the deformation analysis apparatus 200 according to the second exemplary embodiment is employed, however there is no limitation thereto. The deformation analysis apparatus 100 according to the first exemplary embodiment may be employed in cases in which the relative distance L between sensors is fixed.

A deformation analysis apparatus according to a second aspect is configured further including a distance estimation unit that estimates, at each of the specific periods of time, the relative distances between the adjacently installed sensors, wherein: the plurality of sensors are installed such that a relative distance is changed between installation positions of at least two adjacently installed sensors by deformation of the measurement target object; and the coordinate computation unit computes 3D coordinate values of each position corresponding to a 3D shape of the measurement target object at each of the specific periods of time, based on the at least one of 3D coordinate values or rotation angles of the respective installation positions of the plurality of sensors measured at each of the specific periods of time by the measurement unit, based on the at least one of 3D coordinate values or rotation angles of each of the interpolation positions on line segments that connect sensors interpolated at each of the specific periods of time by the interpolation unit, and based on the relative distances between the adjacently installed sensors estimated at each of the specific periods of time by the distance estimation unit.

In a deformation analysis apparatus according to a third aspect, the distance estimation unit estimates the relative distances between the adjacently installed sensors at each of the specific periods of time based on the rotation angles of the respective installation positions of the plurality of sensors measured at each of the specific periods of time by the measurement unit.

In a deformation analysis apparatus according to a fourth aspect, the relative distances between the adjacently installed sensors are estimated at each of the specific periods of time based on acceleration corresponding to the physical quantity detected at each of the specific periods of time by the respective sensors.

In a deformation analysis apparatus according to a fifth aspect, the distance estimation unit estimates the relative distances between sensors by repeatedly updating a candidate value for relative distances between sensors by computing 3D coordinate values of installation positions of the sensors using a candidate value of the relative distances between the adjacently installed sensors based on the at least one of 3D coordinate values or rotation angles of the respective installation positions of the plurality of sensors measured at each of the specific periods of time by the measurement unit, and based on the at least one of 3D coordinate values or rotation angles of each of the interpolation positions on line segments that connect sensors interpolated at each of the specific periods of time by the interpolation unit, and comparing against the 3D coordinate values of the installation positions of the sensors measured by the measurement unit.

In a deformation analysis apparatus according to a sixth aspect, the plurality of sensors are configured such that the sensors are coupled together with a coupling body that fixes the relative distances between the adjacently installed sensors.

What is claimed is:

1. A deformation analysis apparatus comprising:
   a plurality of sensors that are installed at a measurement target object, each sensor detecting a physical quantity acting on an installation position, and the plurality of sensors being installed such that a relative distance is changed between installation positions of at least two adjacently installed sensors by deformation of the measurement target object; and
   a processor programmed to function as:
   a measurement unit that, when deformation has occurred in the measurement target object, measures for each of plural specific periods of time at least one of 3D coordinate values or rotation angles of the respective installation positions of the plurality of sensors based on the physical quantity detected by each of the plurality of sensors;
   an interpolation unit that interpolates at least one of 3D coordinate values or rotation angles, for each of the specific periods of time, at each interpolation position on line segments that connect adjacently installed sensors, based on the at least one of 3D coordinate values or rotation angles of the respective installation positions of the plurality of sensors measured at each of the specific periods of time by the measurement unit;
   a distance estimation unit that estimates relative distances between the adjacently installed sensors at each of the specific periods of time by:
   computing 3D coordinate values of installation positions of the sensors based on a candidate value of the relative distances between the adjacently installed sensors based on: (i) the at least one of 3D coordinate values or rotation angles of the respective installation positions of the plurality of sensors measured at each of the specific periods of time by the measurement unit, and (ii) the at least one of 3D coordinate values or rotation angles of each of the interpolation positions on line segments that connect sensors interpolated at each of the specific periods of time by the interpolation unit,
   comparing the calculated 3D coordinate values against the 3D coordinate values of the installation positions of the sensors measured by the measurement unit, and
   performing the computing and comparing steps by repeatedly updating the candidate value for relative distances between the sensors;
   a coordinate computation unit configured to:
   compute 3D coordinate values of each position corresponding to a 3D shape of the measurement target object at each of the specific periods of time based on:
   the at least one of 3D coordinate values or rotation angles of the respective installation positions of the plurality of sensors measured at each of the specific periods of time by the measurement unit,
   the at least one of 3D coordinate values or rotation angles of each of the interpolation positions on line segments that connect sensors interpolated at each of the specific periods of time by the interpolation unit, and
   relative distances between the adjacently installed sensors that is: along a deformed shape of the measurement target object, or estimated at each of the specific periods of time by the distance estimation unit; and
   compare the computed 3D coordinate values to the measured 3D coordinate values to determine a difference;
   when the determined difference is larger than a specific error: (a) increase the candidate value in response to the computed 3D coordinate value being smaller than the measured 3D coordinate value, and (b) decrease the candidate value in response to the computed 3D coordinate value being larger than the measured 3D coordinate value, such that the difference is less than the specific error after changing the candidate value; and
   an output unit for outputting the computed 3D coordinate values of each position corresponding to a 3D shape of the measurement target object at each of the specific periods of time.

2. The deformation analysis apparatus of claim 1, wherein the plurality of sensors are configured such that the sensors are coupled together with a coupling body that fixes the relative distances between the adjacently installed sensors.

3. A deformation analysis apparatus comprising:
   a plurality of sensors installed at a plurality of installation positions on a measurement target object, each sensor detecting a physical quantity acting on the respective installation position, and the plurality of sensors being installed such that a relative distance is changed between installation positions of at least two adjacently installed sensors by deformation of the measurement target object; and a processor programmed to:
in response to deformation of the measurement target object, measure at least one 3D coordinate value or rotation angle of the respective installation positions based on the physical quantity detected by each of the plurality of sensors for each of plural specific periods of time;
interpolate at least one 3D coordinate value or rotation angle, for each of the specific periods of time at each interpolation position on line segments that connect adjacently installed sensors, based on the measured at least one 3D coordinate value or rotation angle;
estimate relative distances between the adjacently installed sensors at each of the specific periods of time by:
computing 3D coordinate values of installation positions of the sensors using a candidate value of the relative distances between the adjacently installed sensors based on: (i) the at least one of 3D coordinate values or rotation angles of the respective installation positions of the plurality of sensors measured at each of the specific periods of time by the measurement unit, and (ii) the at least one of 3D coordinate values or rotation angles of each of the interpolation positions on line segments that connect sensors interpolated at each of the specific periods of time by the interpolation unit,
comparing the calculated 3D coordinate values against the 3D coordinate values of the installation positions of the sensors measured by the measurement unit, and
performing the computing and comparing steps by repeatedly updating the candidate value for relative distances between the sensors;
determine 3D coordinate values of each position corresponding to a 3D shape of the measurement target object at each of the specific periods of time based on:
the at least one of 3D coordinate values or rotation angles of the respective installation positions of the plurality of sensors measured at each of the specific periods of time by the measurement unit,
the at least one of 3D coordinate values or rotation angles of each of the interpolation positions on line segments that connect sensors interpolated at each of the specific periods of time by the interpolation unit, and
relative distances between the adjacently installed sensors: (A) along a deformed shape of the measurement target object, or (B) estimated at each of the specific periods of time by the distance estimation unit;
comparing the computed 3D coordinate values to the measured 3D coordinate values to determine a difference;
when the determined difference is larger than a specific error: (a) increasing the candidate value in response to the computed 3D coordinate value being smaller than the measured 3D coordinate value, and (b) decreasing the candidate value in response to the computed 3D coordinate value being larger than the 3D measured coordinate value, such that the difference is less than the specific error after changing the candidate value; and
output the computed 3D coordinate values of each position corresponding to a 3D shape of the measurement target object at each of the specific periods of time.

4. The deformation analysis apparatus of claim 3, wherein the plurality of sensors are configured such that the sensors are coupled together with a coupling body that fixes the relative distances between the adjacently installed sensors.

* * * * *